United States Patent
Moyer

(10) Patent No.: US 9,053,233 B2
(45) Date of Patent: Jun. 9, 2015

(54) METHOD AND DEVICE FOR CONTROLLING DEBUG EVENT RESOURCES

(75) Inventor: William C. Moyer, Dripping Springs, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 826 days.

(21) Appl. No.: 13/210,281

(22) Filed: Aug. 15, 2011

(65) Prior Publication Data

US 2013/0047037 A1 Feb. 21, 2013

(51) Int. Cl.
*G06F 11/00* (2006.01)
*G06F 11/36* (2006.01)

(52) U.S. Cl.
CPC .................. *G06F 11/3656* (2013.01)

(58) Field of Classification Search
CPC  G06F 11/362; G06F 11/3664; G06F 11/3656
USPC ...................... 714/25, 30, 32, 38.1
See application file for complete search history.

(56) References Cited

U.S. PATENT DOCUMENTS

| | | | |
|---|---|---|---|
| 4,763,296 A | 8/1988 | Gercekci | |
| 5,204,864 A * | 4/1993 | Won | 714/43 |
| 5,408,643 A | 4/1995 | Katayose | |
| 5,737,516 A * | 4/1998 | Circello et al. | 714/38.13 |
| 6,014,504 A * | 1/2000 | Saine et al. | 716/136 |
| 6,035,422 A * | 3/2000 | Hohl et al. | 714/35 |
| 6,112,320 A | 8/2000 | Dien | |
| 6,321,331 B1 | 11/2001 | Roy et al. | |
| 6,324,683 B1 * | 11/2001 | Fuh et al. | 717/124 |
| 6,553,513 B1 | 4/2003 | Swoboda et al. | |
| 6,591,378 B1 | 7/2003 | Arends et al. | |
| 6,643,803 B1 | 11/2003 | Swoboda et al. | |
| 6,708,270 B1 | 3/2004 | Mayer | |
| 6,895,530 B2 * | 5/2005 | Moyer et al. | 714/25 |
| 7,219,264 B2 | 5/2007 | Pail et al. | |
| 7,296,137 B2 | 11/2007 | Moyer | |
| 7,376,864 B1 * | 5/2008 | Hu et al. | 714/6.13 |
| 7,574,585 B1 * | 8/2009 | Nekl et al. | 712/227 |
| 7,590,891 B2 | 9/2009 | Ishihara | |
| 7,681,078 B2 * | 3/2010 | Moyer | 714/23 |
| 7,710,718 B2 | 5/2010 | Merkin et al. | |
| 7,870,430 B2 | 1/2011 | Robertson et al. | |
| 7,870,434 B2 * | 1/2011 | Moyer et al. | 714/41 |
| 8,504,875 B2 * | 8/2013 | Orita et al. | 714/30 |
| 2001/0010083 A1 | 7/2001 | Satoh | |

(Continued)

FOREIGN PATENT DOCUMENTS

JP        2006259802 A  *  9/2006

OTHER PUBLICATIONS

Freescale Semiconductor, Inc.; "e200z6 PowerPC(TM) Core Reference Manual," Chapter 10: Debug Support; pp. 10-1 through 10-14; 2004; printed from <<http://www.freescale.com/files/32bit/doc/ref_manual/E200Z6_RM.pdf>>; 16 pages.

*Primary Examiner* — Loan L. T. Truong

(57) ABSTRACT

Software executed at a data processor unit includes a software debugger. The software debugger can be assigned responsibility for servicing a debug event, and be authorized to allow software control of debug event resources associated with the debug event. An indicator, when asserted, prevents a authorized request by software to control a debug event resource.

20 Claims, 16 Drawing Sheets

(56) References Cited

U.S. PATENT DOCUMENTS

| | | |
|---|---|---|
| 2001/0032305 A1 | 10/2001 | Barry |
| 2002/0035721 A1* | 3/2002 | Swoboda ........................ 717/4 |
| 2002/0087918 A1* | 7/2002 | Miura et al. .................... 714/38 |
| 2003/0074650 A1* | 4/2003 | Akgul et al. ................... 717/129 |
| 2003/0093685 A1 | 5/2003 | Tobin |
| 2004/0148548 A1* | 7/2004 | Moyer et al. ................... 714/25 |
| 2004/0260910 A1* | 12/2004 | Watt et al. ..................... 712/43 |
| 2005/0027973 A1 | 2/2005 | Barry et al. |
| 2005/0149693 A1 | 7/2005 | Barry |
| 2005/0289397 A1* | 12/2005 | Haruki et al. .................. 714/38 |
| 2006/0005260 A1* | 1/2006 | Haruki et al. .................. 726/27 |
| 2006/0020941 A1* | 1/2006 | Inamura et al. ............... 718/100 |
| 2006/0117166 A1 | 6/2006 | Barry |
| 2006/0212858 A1* | 9/2006 | Kamei et al. .................. 717/140 |
| 2008/0222333 A1 | 9/2008 | Barry et al. |
| 2009/0100254 A1* | 4/2009 | Moyer et al. ................... 712/227 |
| 2009/0106609 A1* | 4/2009 | Sato ............................... 714/726 |
| 2009/0177830 A1* | 7/2009 | Orion et al. .................... 710/267 |
| 2009/0222692 A1* | 9/2009 | Robertson et al. ............. 714/25 |
| 2009/0222693 A1* | 9/2009 | Moyer et al. ................... 714/25 |
| 2009/0307783 A1* | 12/2009 | Maeda et al. .................. 726/30 |
| 2012/0079254 A1* | 3/2012 | Williams et al. ............... 712/227 |

\* cited by examiner

FIG. 5

| BIT(S) | NAME | DESCRIPTION | |
|---|---|---|---|
| 0 | EDM | EXTERNAL DEBUG MODE. THIS BIT IS READ-ONLY BY SOFTWARE.<br>0 - EXTERNAL DEBUG MODE DISABLED. INTERNAL DEBUG EVENTS NOT MAPPED INTO EXTERNAL DEBUG EVENTS.<br>1 - EXTERNAL DEBUG MODE ENABLED. EVENTS WILL NOT CAUSE THE CPU TO VECTOR TO INTERRUPT CODE, SOFTWARE IS NOT PERMITTED TO WRITE TO DEBUG REGISTERS (DBCRx, DBSR, DBCNT1-2, IAC1-4, DAC1-2, DVC1-2). | 52 |
| 1 | IDM | INTERNAL DEBUG MODE<br>0 - DEBUG EXCEPTIONS ARE DISABLED. DEBUG EVENTS DO NOT AFFECT DBSR UNLESS EDM IS SET.<br>1 - DEBUG EXCEPTIONS ARE ENABLED. ENABLED DEBUG EVENTS WILL UPDATE THE DBSR AND MAY CAUSE THE CPU TO VECTOR TO INTERRUPT CODE. SOFTWARE IS PERMITTED TO WRITE TO DEBUG REGISTERS. | 54 |
| 2:3 | RST | RESET CONTROL<br>00 - NO FUNCTION<br>01 - RESERVED<br>10 - P_RESETOUT_B PIN ASSERTED BY DEBUG RESET CONTROL TO INITIATE PROCESSOR RESET.<br>11 - RESERVED<br>NOTE: THIS FIELD IS UNCONDITIONALLY RESET ON ANY RESET CONDITION. | 56 |
| 4 | ICMP | INSTRUCTION COMPLETE DEBUG EVENT ENABLE<br>0 - ICMP DEBUG EVENTS ARE DISABLED<br>1 - ICMP DEBUG EVENTS ARE ENABLED | 58 |
| 5 | BRT | BRANCH TAKEN DEBUG EVENT ENABLE<br>0 - BRT DEBUG EVENTS ARE DISABLED<br>1 - BRT DEBUG EVENTS ARE ENABLED | 60 |
| 6 | IAC1 | INSTRUCTION ADDRESS COMPARE 1 DEBUG EVENT ENABLE<br>0 - IAC1 DEBUG EVENTS ARE DISABLED<br>1 - IAC1 DEBUG EVENTS ARE ENABLED | 61 |
| 7 | IAC2 | INSTRUCTION ADDRESS COMPARE 2 DEBUG EVENT ENABLE<br>0 - IAC2 DEBUG EVENTS ARE DISABLED<br>1 - IAC2 DEBUG EVENTS ARE ENABLED | 62 |
| 8 | IAC3 | INSTRUCTION ADDRESS COMPARE 3 DEBUG EVENT ENABLE<br>0 - IAC3 DEBUG EVENTS ARE DISABLED<br>1 - IAC3 DEBUG EVENTS ARE ENABLED | 63 |
| 9 | IAC4 | INSTRUCTION ADDRESS COMPARE 4 DEBUG EVENT ENABLE<br>0 - IAC4 DEBUG EVENTS ARE DISABLED<br>1 - IAC4 DEBUG EVENTS ARE ENABLED | 64 |

| BIT(S) | NAME | DESCRIPTION | |
|---|---|---|---|
| 10:11 | DAC1 | DATA ADDRESS COMPARE 1 DEBUG EVENT ENABLE<br>00 - DAC1 DEBUG EVENTS ARE DISABLED<br>01 - DAC1 DEBUG EVENTS ARE ENABLED ONLY FOR STORE-TYPE DATA STORAGE ACCESSES<br>10 - DAC1 DEBUG EVENTS ARE ENABLED ONLY FOR LOAD-TYPE DATA STORAGE ACCESSES<br>11 - DAC1 DEBUG EVENTS ARE ENABLED FOR LOAD-TYPE OR STORE-TYPE DATA STORAGE ACCESSES | ~66 |
| 12:13 | DAC2 | DATA ADDRESS COMPARE 2 DEBUG EVENT ENABLE<br>00 - DAC2 DEBUG EVENTS ARE DISABLED<br>01 - DAC2 DEBUG EVENTS ARE ENABLED ONLY FOR STORE-TYPE DATA STORAGE ACCESSES<br>10 - DAC2 DEBUG EVENTS ARE ENABLED ONLY FOR LOAD-TYPE DATA STORAGE ACCESSES<br>11 - DAC2 DEBUG EVENTS ARE ENABLED FOR LOAD-TYPE OR STORE-TYPE DATA STORAGE ACCESSES | ~68 |
| 14 | DCNT1 | DEBUG COUNTER 1 DEBUG EVENT ENABLE<br>0 - COUNTER 1 DEBUG EVENTS ARE DISABLED<br>1 - COUNTER 1 DEBUG EVENTS ARE ENABLED | ~70 |
| 15 | DCNT2 | DEBUG COUNTER 2 DEBUG EVENT ENABLE<br>0 - COUNTER 2 DEBUG EVENTS ARE DISABLED<br>1 - COUNTER 2 DEBUG EVENTS ARE ENABLED | ~71 |
| 16 | TRAP | TRAP TAKEN DEBUG ENABLE<br>0 - TRAP DEBUG EVENTS ARE DISABLED<br>1 - TRAP DEBUG EVENTS ARE ENABLED | ~72 |
| 17-31 | - | RESERVED | ~73 |

FIG. 6

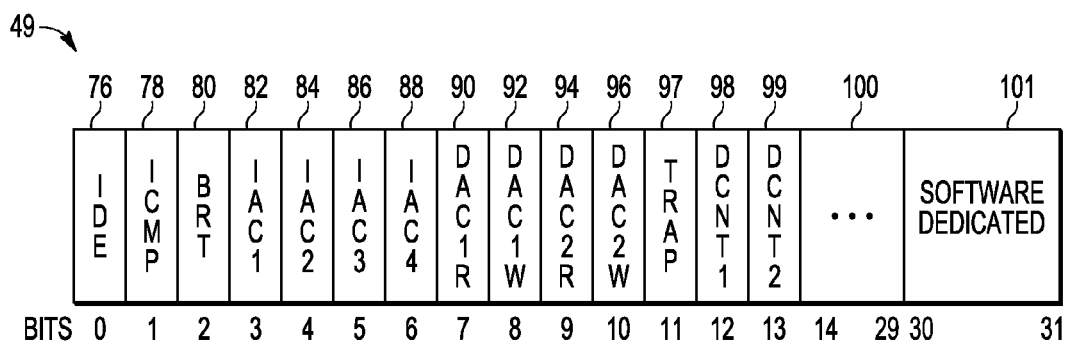

| BIT(S) | NAME | DESCRIPTION | |
|---|---|---|---|
| 0 | IDE | IMPRECISE DEBUG EVENT<br>SET TO 1 IF DEBUG EXCEPTIONS ARE DISABLED AND A DEBUG EVENT CAUSES ITS RESPECTIVE DEBUG STATUS REGISTER BIT TO BE SET TO 1. | ~76 |
| 1 | ICMP | INSTRUCTION COMPLETE DEBUG EVENT<br>SET TO 1 IF AN INSTRUCTION COMPLETE DEBUG EVENT OCCURRED. | ~78 |
| 2 | BRT | BRANCH TAKEN DEBUG EVENT<br>SET TO 1 IF A BRANCH TAKEN DEBUG OCCURRED. | ~80 |
| 3 | IAC1 | INSTRUCTION ADDRESS COMPARE 1 DEBUG EVENT<br>SET TO 1 IF AN IAC1 DEBUG EVENT OCCURRED. | ~82 |
| 4 | IAC2 | INSTRUCTION ADDRESS COMPARE 2 DEBUG EVENT<br>SET TO 1 IF AN IAC2 DEBUG EVENT OCCURRED. | ~84 |
| 5 | IAC3 | INSTRUCTION ADDRESS COMPARE 3 DEBUG EVENT<br>SET TO 1 IF AN IAC3 DEBUG EVENT OCCURRED. | ~86 |
| 6 | IAC4 | INSTRUCTION ADDRESS COMPARE 4 DEBUG EVENT<br>SET TO 1 IF AN IAC4 DEBUG EVENT OCCURRED. | ~88 |
| 7 | DAC1R | DATA ADDRESS COMPARE 1 READ DEBUG EVENT<br>SET TO 1 IF 1 READ-TYPE DAC1 DEBUG EVENT OCCURRED WHILE DBCR0[DAC1]=0b01 OR DBCR0[DAC1]=0b11 | ~90 |
| 8 | DAC1W | DATA ADDRESS COMPARE 1 READ DEBUG EVENT<br>SET TO 1 IF 1 READ-TYPE DAC1 DEBUG EVENT OCCURRED WHILE DBCR0[DAC1]=0b01 OR DBCR0[DAC1]=0b11 | ~92 |
| 9 | DAC2R | DATA ADDRESS COMPARE 2 READ DEBUG EVENT<br>SET TO 1 IF 1 READ-TYPE DAC2 DEBUG EVENT OCCURRED WHILE DBCR0[DAC2]=0b01 OR DBCR0[DAC2]=0b11 | ~94 |
| 10 | DAC2W | DATA ADDRESS COMPARE 2 READ DEBUG EVENT<br>SET TO 1 IF 1 READ-TYPE DAC2 DEBUG EVENT OCCURRED WHILE DBCR0[DAC2]=0b01 OR DBCR0[DAC2]=0b11 | ~96 |
| 11 | TRAP | TRAP TAKEN DEBUG EVENT<br>SET TO 1 IF A TRAP TAKEN DEBUG EVENT OCCURRED. | ~97 |
| 12 | DCNT1 | DEBUG COUNTER 1 DEBUG EVENT<br>SET TO 1 IF A DCNT 1 DEBUG EVENT OCCURRED. | ~98 |
| 13 | DCNT2 | DEBUG COUNTER 2 DEBUG EVENT<br>SET TO 1 IF A DCNT 2 DEBUG EVENT OCCURRED. | ~99 |
| 14-29 | - | RESERVED | ~100 |
| 30-31 | - | SOFTWARE DEDICATED | ~101 |

| Bit | Label |
|---|---|
| 31 | FT (162) |
| 30 | ⋮ (160) |
| 29 | |
| 28 | |
| 27 | BKPT (158) |
| 26 | CRET (156) |
| 25 | CIRPT (154) |
| 24 | DCNT2 (152) |
| 23 | DCNT1 (150) |
| 22 | DEVT2 (148) |
| 21 | DEVT1 (146) |
| 20 | 0 (144) |
| 19 | |
| 18 | |
| 17 | |
| 16 | RET (142) |
| 15 | 0 (140) |
| 14 | DAC2 (138) |
| 13 | 0 (136) |
| 12 | DAC1 (134) |
| 11 | IAC4 (132) |
| 10 | IAC3 (130) |
| 9 | IAC2 (128) |
| 8 | IAC1 (126) |
| 7 | TRAP (124) |
| 6 | IRPT (122) |
| 5 | BRT (120) |
| 4 | ICMP (118) |
| 3 | UDE (116) |
| 2 | RST (114) |
| 1 | IDM (112) |
| 0 | 0 (110) |

| BIT(S) | NAME | DESCRIPTION | |
|---|---|---|---|
| 0 | - | RESERVED | ~110 |
| 1 | IDM | INTERNAL DEBUG MODE CONTROL<br>0 - INTERNAL DEBUG MODE MAY NOT BE ENABLED BY SOFTWARE. DBCR0[IDM] IS OWNED EXCLUSIVELY BY HARDWARE. mtspr DBCR0-4, DBCNT OR DBSR IS ALWAYS IGNORED. NO RESOURCE SHARING OCCURS, REGARDLESS OF THE SETTINGS OF OTHER FIELDS IN DBERC0. HARDWARE EXCLUSIVELY OWNS ALL RESOURCES. mtspr ACCESS BY SOFTWARE RETURNS 0.<br>1 - INTERNAL DEBUG MODE MAY BE ENABLED BY SOFTWARE. DBCR0[IDM] AND DBSR[IDE] ARE OWNED BY SOFTWARE DBCR0[IDM], DBSR[IDE], AND DBSR[MRR] ARE SOFTWARE READABLE/WRITEABLE.<br>WHEN DBERC0[IDM]=1, HARDWARE-OWNED STATUS AND CONTROL BITS IN DBSR ARE MASKED FROM SOFTWARE ACCESS AND READ AS 0. SOFTWARE WRITES TO HARDWARE-OWNED BITS IN DBCR0-4, DBCNT, AND DBSR VIA mtspr ARE IGNORED. | ~112 |
| 2 | RST | RESET FIELD CONTROL<br>0 - DBCR0[RST] OWNED EXCLUSIVELY BY HARDWARE DEBUG. NO mtspr ACCESS BY SOFTWARE TO DBCR0[RST] FIELD. mfspr ACCESS BY SOFTWARE RETURNS 0.<br>1 - DBCR0[RST] ACCESSIBLE BY SOFTWARE DEBUG. DBCR0[RST] IS SOFTWARE READABLE/WRITEABLE. | ~114 |
| 3 | UDE | UNCONDITIONAL DEBUG EVENT<br>0 - EVENT OWNED BY HARDWARE DEBUG. NO mtspr ACCESS BY SOFTWARE TO DBCR[UDE] FIELD. mfspr ACCESS BY SOFTWARE RETURNS 0.<br>1 - EVENT OWNED BY SOFTWARE DEBUG. DBCR[UDE] IS SOFTWARE READABLE/WRITEABLE. | ~116 |
| 4 | ICMP | INSTRUCTION COMPLETE DEBUG EVENT<br>0 - EVENT OWNED BY HARDWARE DEBUG. NO mtspr ACCESS BY SOFTWARE TO DBCR0[ICMP] OR DBSR[ICMP] FIELDS. mfspr ACCESS BY SOFTWARE RETURNS 0.<br>1 - EVENT OWNED BY SOFTWARE DEBUG. DBCR0[ICMP] AND DBSR[ICMP] ARE SOFTWARE READABLE/WRITEABLE. | ~118 |
| 5 | BRT | BRANCH TAKEN DEBUG EVENT<br>0 - EVENT OWNED BY HARDWARE DEBUG. NO mtspr ACCESS BY SOFTWARE TO DBCR0[BRT] OR DBSR[BRT] FIELDS. mfspr ACCESS BY SOFTWARE RETURNS 0.<br>1 - EVENT OWNED BY SOFTWARE DEBUG. DBCR0[BRT] AND DBSR[BRT] ARE SOFTWARE READABLE/WRITEABLE. | ~120 |

FIG. 10

| BIT(S) | NAME | DESCRIPTION | |
|---|---|---|---|
| 6 | IRPT | INTERRUPT TAKEN DEBUG EVENT<br>0 - EVENT OWNED BY HARDWARE DEBUG. NO mtspr ACCESS BY SOFTWARE TO DBCR0[IRPT] OR DBSR[IRPT] FIELDS. mfspr ACCESS BY SOFTWARE RETURNS 0.<br>1 - EVENT OWNED BY SOFTWARE DEBUG. DBCR0[IRPT] AND DBSR[IRPT] ARE SOFTWARE READABLE/WRITEABLE. | ~122 |
| 7 | TRAP | TRAP TAKEN DEBUG EVENT<br>0 - EVENT OWNED BY HARDWARE DEBUG. NO mtspr ACCESS BY SOFTWARE TO DBCR0[TRAP] OR DBSR[TRAP] FIELDS. mfspr ACCESS BY SOFTWARE RETURNS 0.<br>1 - EVENT OWNED BY SOFTWARE DEBUG. DBCR0[TRAP] AND DBSR[TRAP] ARE SOFTWARE READABLE/WRITEABLE. | ~124 |
| 8 | IAC1 | INSTRUCTION ADDRESS COMPARE 1 DEBUG EVENT<br>0 - EVENT OWNED BY HARDWARE DEBUG. NO mtspr ACCESS BY SOFTWARE TO IAC1 CONTROL AND STATUS FIELDS. mfspr ACCESS BY SOFTWARE RETURNS 0.<br>1 - EVENT OWNED BY SOFTWARE DEBUG. IAC1 CONTROL AND STATUS FIELDS ARE SOFTWARE READABLE/WRITEABLE. | ~126 |
| 9 | IAC2 | INSTRUCTION ADDRESS COMPARE 2 DEBUG EVENT<br>0 - EVENT OWNED BY HARDWARE DEBUG. NO mtspr ACCESS BY SOFTWARE TO IAC2 CONTROL AND STATUS FIELDS. mfspr ACCESS BY SOFTWARE RETURNS 0.<br>1 - EVENT OWNED BY SOFTWARE DEBUG. IAC2 CONTROL AND STATUS FIELDS ARE SOFTWARE READABLE/WRITEABLE. | ~128 |
| 10 | IAC3 | INSTRUCTION ADDRESS COMPARE 3 DEBUG EVENT<br>0 - EVENT OWNED BY HARDWARE DEBUG. NO mtspr ACCESS BY SOFTWARE TO IAC3 CONTROL AND STATUS FIELDS. mfspr ACCESS BY SOFTWARE RETURNS 0.<br>1 - EVENT OWNED BY SOFTWARE DEBUG. IAC3 CONTROL AND STATUS FIELDS ARE SOFTWARE READABLE/WRITEABLE. | ~130 |
| 11 | IAC4 | INSTRUCTION ADDRESS COMPARE 4 DEBUG EVENT<br>0 - EVENT OWNED BY HARDWARE DEBUG. NO mtspr ACCESS BY SOFTWARE TO IAC4 CONTROL AND STATUS FIELDS. mfspr ACCESS BY SOFTWARE RETURNS 0.<br>1 - EVENT OWNED BY SOFTWARE DEBUG. IAC4 CONTROL AND STATUS FIELDS ARE SOFTWARE READABLE/WRITEABLE AUTHORIZED. | ~132 |

FIG. 11

| BIT(S) | NAME | DESCRIPTION | |
|---|---|---|---|
| 12 | DAC1 | DATA ADDRESS COMPARE 1 DEBUG EVENT<br>0 - EVENT OWNED BY HARDWARE DEBUG. NO mtspr ACCESS BY SOFTWARE TO DAC1 CONTROL AND STATUS FIELDS. mfspr ACCESS BY SOFTWARE RETURNS 0.<br>1 - EVENT OWNED BY SOFTWARE DEBUG. DAC1 CONTROL AND STATUS FIELDS ARE SOFTWARE READABLE/WRITEABLE. | ~134 |
| 13 | - | RESERVED | ~136 |
| 14 | DAC2 | DATA ADDRESS COMPARE 2 DEBUG EVENT<br>0 - EVENT OWNED BY HARDWARE DEBUG. NO mtspr ACCESS BY SOFTWARE TO DAC2 CONTROL AND STATUS FIELDS. mfspr ACCESS BY SOFTWARE RETURNS 0.<br>1 - EVENT OWNED BY SOFTWARE DEBUG. DAC2 CONTROL AND STATUS FIELDS ARE SOFTWARE READABLE/WRITEABLE. | ~138 |
| 15 | - | RESERVED | ~140 |
| 16 | RET | RETURN DEBUG EVENT<br>0 - EVENT OWNED BY HARDWARE DEBUG. NO mtspr ACCESS BY SOFTWARE TO DBCR0[RET] OR DBSR[RET] FIELDS. mfspr ACCESS BY SOFTWARE RETURNS 0.<br>1 - EVENT OWNED BY SOFTWARE DEBUG. DBCR0[RET] AND DBSR[RET] ARE SOFTWARE READABLE/WRITEABLE. | ~142 |
| 17:20 | - | RESERVED | ~144 |
| 21 | DEVT1 | EXTERNAL DEBUG EVENT 1 DEBUG EVENT<br>0 - EVENT OWNED BY HARDWARE DEBUG. NO mtspr ACCESS BY SOFTWARE TO DBCR0[DEVT1] OR DBSR[DEVT1] FIELDS. mfspr ACCESS BY SOFTWARE RETURNS 0.<br>1 - EVENT OWNED BY SOFTWARE DEBUG. DBCR0[DEVT1] AND DBSR[DEVT1] ARE SOFTWARE READABLE/WRITEABLE. | ~146 |
| 22 | DEVT2 | EXTERNAL DEBUG EVENT 2 DEBUG EVENT<br>0 - EVENT OWNED BY HARDWARE DEBUG. NO mtspr ACCESS BY SOFTWARE TO DBCR0[DEVT2] OR DBSR[DEVT2] FIELDS. mfspr ACCESS BY SOFTWARE RETURNS 0.<br>1 - EVENT OWNED BY SOFTWARE DEBUG. DBCR0[DEVT2] AND DBSR[DEVT2] ARE SOFTWARE READABLE/WRITEABLE. | ~148 |

FIG. 12

| BIT(S) | NAME | DESCRIPTION | |
|---|---|---|---|
| 23 | DCNT1 | DEBUG COUNTER 1 DEBUG EVENT<br>0 - EVENT OWNED BY HARDWARE DEBUG. NO mtspr ACCESS BY SOFTWARE TO COUNTER 1 CONTROL AND STATUS FIELDS. mfspr ACCESS BY SOFTWARE RETURNS 0.<br>1 - EVENT OWNED BY SOFTWARE DEBUG. COUNTER 1 CONTROL AND STATUS FIELDS ARE SOFTWARE READABLE/WRITEABLE. | ~150 |
| 24 | DCNT2 | DEBUG COUNTER 2 DEBUG EVENT<br>0 - EVENT OWNED BY HARDWARE DEBUG. NO mtspr ACCESS BY SOFTWARE TO COUNTER 2 CONTROL AND STATUS FIELDS. mfspr ACCESS BY SOFTWARE RETURNS 0.<br>1 - EVENT OWNED BY SOFTWARE DEBUG. COUNTER 2 CONTROL AND STATUS FIELDS ARE SOFTWARE READABLE/WRITEABLE. | ~152 |
| 25 | CIRPT | CRITICAL INTERRUPT TAKEN DEBUG EVENT<br>0 - EVENT OWNED BY HARDWARE DEBUG. NO mtspr ACCESS BY SOFTWARE TO DBCR0[CIRPT] OR DBSR[CIRPT] FIELDS. mfspr ACCESS BY SOFTWARE RETURNS 0.<br>1 - EVENT OWNED BY SOFTWARE DEBUG. DBCR0[CIRPT] AND DBSR[CIRPT] ARE SOFTWARE READABLE/WRITEABLE. | ~154 |
| 26 | CRET | CRITICAL RETURN DEBUG EVENT<br>0 - EVENT OWNED BY HARDWARE DEBUG. NO mtspr ACCESS BY SOFTWARE TO DBCR0[CRET] OR DBSR[CRET] FIELDS. mfspr ACCESS BY SOFTWARE RETURNS 0.<br>1 - EVENT OWNED BY SOFTWARE DEBUG. DBCR0[CRET] AND DBSR[CRET] ARE SOFTWARE READABLE/WRITEABLE. | ~156 |
| 22 | BKPT | BREAKOUT INSTRUCTION DEBUG EVENT<br>0 - BREAKOUT OWNED BY HARDWARE DEBUG. EXECUTION OF A BKPT INSTRUCTION (ALL 0'S OPCODE) RESULTS IN ENTRY INTO DEBUG MODE.<br>1 - BREAKOUT OWNED BY SOFTWARE DEBUG. EXECUTION OF A BKPT INSTRUCTION (ALL 0'S OPCODE) RESULTS IN ILLEGAL INSTRUCTION EXCEPTIONAL. | ~158 |
| 27:30 | - | RESERVED | ~160 |
| 31 | FT | FREEZE TIMER DEBUG CONTROL<br>0 - DBCR0[FT] OWNED BY HARDWARE DEBUG. NO ACCESS BY SOFTWARE.<br>1 - DBCR0[FT] OWNED BY SOFTWARE DEBUG. DBSR[FT] IS SOFTWARE READABLE/WRITEABLE. | ~162 |

| DBCR0[EDM] | DBERC0[IDM] | DBERC0[RST] | DBERC0[BRT] | DBERC0[TRAP] | DBERC0[IAC1] | DBERC0[IAC2] | DBERC0[IAC3] | DBERC0[IAC4] | DBERC0[DAC1] | DBERC0[DAC2] | DBERC0[DEVT1] | DBERC0[DEVT2] | DBERC0[DCNT1] | DBERC0[DCNT2] | IN1 | SOFTWARE ACCESSIBLE | |
|---|---|---|---|---|---|---|---|---|---|---|---|---|---|---|---|---|---|
| 0 | - | - | - | - | - | - | - | - | - | - | - | - | - | - | - | DBCR0-4, DBSR, DBCNT | ~172 |
| 1 | 1 | - | - | - | - | - | - | - | - | - | - | - | - | - | - | DBCR0[IDM], DBSR[IDE, VLES] | ~176 |
| 1 | 1 | 1 | - | - | - | - | - | - | - | - | - | - | - | - | - | DBCR0[RST] | ~178 |
| 1 | 1 | - | - | - | - | - | - | - | - | - | - | - | - | - | - | DBCR0[ICMP], DBSR[ICMP] | ~180 |
| 1 | 1 | - | 1 | - | - | - | - | - | - | - | - | - | - | - | - | DBCR0[BRT], DBSR[BRT] | ~182 |
| 1 | 1 | - | - | 1 | - | - | - | - | - | - | - | - | - | - | - | DBCR0[TRAP], DBSR[TRAP] | ~184 |
| 1 | 1 | - | - | - | 1 | - | - | - | - | - | - | - | - | - | - | IAC1, DBCR0[IAC1], DBCR1[IAC1US, IAC1ER], DBSR[IAC1] | ~186 |
| 1 | 1 | - | - | - | - | 1 | - | - | - | - | - | - | - | - | - | IAC2, DBCR0[IAC2], DBCR1[IAC2US, IAC2ER], DBSR[IAC2] | ~188 |
| 1 | 1 | - | - | - | 1 | 1 | - | - | - | - | - | - | - | - | - | DBCR1[IAC12M] | ~190 |
| 1 | 1 | - | - | - | - | - | 1 | - | - | - | - | - | - | - | - | IAC3, DBCR0[IAC3], DBCR1[IAC3US, IAC3ER], DBSR[IAC3] | ~192 |
| 1 | 1 | - | - | - | - | - | - | 1 | - | - | - | - | - | - | 0 | IAC4, DBCR0[IAC4], DBCR1[IAC4US, IAC4ER], DBSR[IAC4] | ~194 |
| 1 | 1 | - | - | - | - | - | - | 1 | - | - | - | - | - | - | 1 | IAC (R0) DBCR0 (R0) DBCR1[IACUS, IAC4ER], DBSR[IAC4] | ~195 |
| 1 | 1 | - | - | - | - | - | 1 | 1 | - | - | - | - | - | - | - | DBCR1[IAC34M] | ~196 |
| 1 | 1 | - | - | - | - | - | - | - | 1 | - | - | - | - | - | - | DAC1, DVC1, DBCR0[DAC1], DBCR2[IAC1US, DAC1ER, DVC1M, DVC1BE], DBCR4[DVC1C] DBSR[DAC1R, DAC1W] | ~198 |

| DBCR0[EDM] | DBCR0[IDM] | DBERC0[RST] | DBERC0[BRT] | DBERC0[TRAP] | DBERC0[IAC1] | DBERC0[IAC2] | DBERC0[IAC3] | DBERC0[IAC4] | DBERC0[DAC1] | DBERC0[DAC2] | DBERC0[DEVT1] | DBERC0[DEVT2] | DBERC0[DCNT1] | DBERC0[DCNT2] | IN1 | SOFTWARE ACCESSIBLE | |
|---|---|---|---|---|---|---|---|---|---|---|---|---|---|---|---|---|---|
| 1 | 1 | - | - | - | - | - | - | - | - | - | - | - | - | - | - | DAC1, DVC2, DBCR0[DAC2], DBCR2[DAC1US, DAC2ER, DVC2M, DVC2BE] DBCR4[DVC2C] DBSR[DAC2R, DAC2W] | ←200 |
| 1 | 1 | - | - | - | - | - | - | - | 1 | 1 | - | - | - | - | - | DBCR2[DAC12M] | ←202 |
| 1 | 1 | - | - | 1 | - | - | - | 1 | - | - | - | - | - | - | DBCR2[DAC1LNK] | ←204 |
| 1 | 1 | - | - | - | - | 1 | - | - | 1 | - | - | - | - | - | - | DBCR2[DAC2LNK] | ←206 |
| 1 | 1 | - | - | - | - | - | - | - | - | - | - | - | 1 | - | - | DBCR0[DCNT1], DBCR3[DEVTC1], DEVT2C1, ICMPC1, IAC1C1, IAC2C1, IAC3C2, IAC4C1, DAC1RC1, DAC1WC1, DAC2RC1, DAC2WC1, IRPTC1, RETC1, DEVT1T1, DEVT2C1, IAC1T1, IAC3T1, DAC1RT1, DAC1WT1, CNT2T1], DBSR[DCNT1, CNT1TRG], DBCNT[CNT1] | ←208 |
| 1 | 1 | - | - | - | - | - | - | - | - | - | - | - | - | 1 | - | DBCR0[DCNT1], DBCR3[DEVTC2], DEVT2C2, ICMPC2, IAC1C2, IAC2C2, IAC3C2, IAC4C2, DAC1RC2, DAC1WC2, DAC2RC2, DAC2WC2], DBSR[DCNT1, DBCNT[CNT1] | ←210 |

FIG. 15

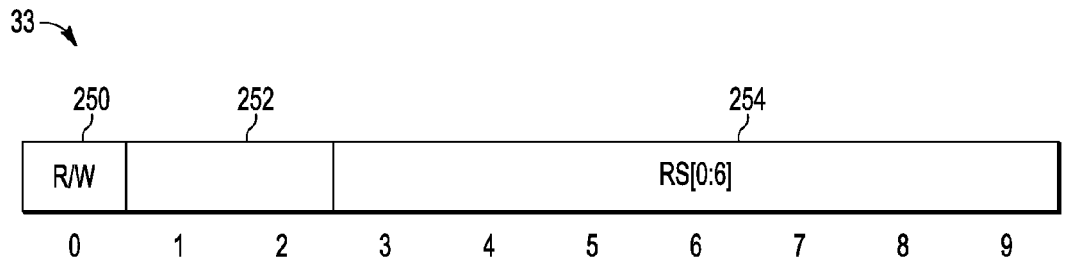

FIG. 18

| BIT(S) | NAME | DESCRIPTION | |
|---|---|---|---|
| 0 | R/W | READ/WRITE COMMAND BIT<br>THE R/W BIT SPECIFIES THE DIRECTION OF DATA TRANSFER. THE TABLE BELOW DESCRIBES THE OPTIONS DEFINED BT THE R/W BIT.<br>  0 - WRITE THE DATA ASSOCIATED WITH THE COMMAND INTO THE REGISTER SPECIFIED BY RS[0:6].<br>  1 - READ THE DATA CONTAINED IN THE REGISTER SPECIFIED BY RS[0:6].<br>NOTE: THE R/W BIT GENERALLY IGNORED FOR READ-ONLY OR WRITE-ONLY REGISTERS. | 250 |
| 1:2 | - | RESERVED | 252 |
| 3:9 | RS | REGISTER SELECT<br>  THE REGISTER SELECT BITS DEFINE WHICH REGISTER IS SOURCE (DESTINATION) FOR THE READ (WRITE) OPERATION. ATTEMPTED WRITES TO READ-ONLY REGISTERS ARE IGNORED. | 254 |

| RS[0:6] | REGISTER SELECTED | |
|---|---|---|
| 000 0000 | RESERVED | ~262 |
| 000 0001 | RESERVED | ~264 |
| 000 0010 | JTAG ID (READ-ONLY) | ~266 |
| 000 0011 - 000 1111 | RESERVED | ~268 |
| 001 0001 | NO REGISTER SELECTED (BYPASS) | ~270 |
| 001 0011 | RESERVED | ~272 |
| 001 0100 - 001 1111 | RESERVED | ~274 |
| 010 0000 | INSTRUCTION ADDRESS COMPARE 1 (IAC1) | ~276 |
| 010 0001 | INSTRUCTION ADDRESS COMPARE 2 (IAC2) | ~278 |
| 010 0010 | INSTRUCTION ADDRESS COMPARE 3 (IAC3) | ~280 |
| 010 0011 | INSTRUCTION ADDRESS COMPARE 4 (IAC4) | ~282 |
| 010 0100 | DATA ADDRESS COMPARE 1 (DAC1) | ~284 |
| 010 0101 | DATA ADDRESS COMPARE 2 (DAC2) | ~286 |
| 010 0110 | DATA VALUE COMPARE 1 (DVC1) | ~288 |
| 010 0111 | DATA VALUE COMPARE 2 (DVC2) | ~290 |
| 010 1000 - 010 1011 | RESERVED | ~292 |
| 010 1100 | DEBUG COUNTER REGISTER (DBCNT) | ~294 |
| 010 1101 - 010 1111 | RESERVED | ~296 |
| 011 0000 | DEBUG STATUS REGISTER (DBSR) | ~298 |
| 011 0001 | DEBUG CONTROL REGISTER 0 (DBCR0) | ~300 |
| 011 0010 | DEBUG CONTROL REGISTER 1 (DBCR1) | ~302 |
| 011 0011 | DEBUG CONTROL REGISTER 2 (DBCR2) | ~304 |
| 011 0100 | DEBUG CONTROL REGISTER 3 (DBCR3) | ~306 |
| 011 0101 - 011 1110 | RESERVED (DO NOT ACCESS) | ~308 |
| 011 1111 | DEBUG EXTERNAL RESOURCE CONTROL (DBERC0) | ~310 |
| 100 0000 - 111 1110 | RESERVED (DO NOT ACCESS) | ~312 |
| 111 1111 | BYPASS | ~314 |

260

METHOD AND DEVICE FOR CONTROLLING DEBUG EVENT RESOURCES

THE BACKGROUND

1. Field of the Disclosure

This disclosure relates generally to data processing systems, and more specifically, to a system and method for controlling debug event resources.

2. Related Art

Resources that are internal to a data processor are commonly used to detect the occurrence of various debug events at the data processor. Such internal debug event resources are referred to herein as debug detection resources and include debug registers and logic modules that detect the occurrence of the various debug events and send notification in response. Notification as to the occurrence of a debug event can be accomplished by transmitting debug information to an external debugger or to a non-external debugger. An external debugger is a debugger external a data processor that communicates with the data processor via a dedicated debug interface of the data processor. Non-external debug resources can include: peripherals external the data processor that receive debug notifications via an interface other than the debug interface; software debuggers that comprise a one or more software routines executed at the data processor responsive to notification of the debug event; and the like. The debug events handled by the debug detection resources can include instruction breakpoints, data breakpoints, various execution event breakpoints, and the like. Errors may be present within internal debug event resources, such as the software debugger, that may result, for example, in inaccurate debug operations. However, difficulties exist in actually debugging the use of internal debug event resources and themselves.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIGS. 5 and 6 show, in a tabular form, functionality of a portion of the debug control register of FIG. 4, in accordance with one embodiment of the present invention.

FIG. 7 is a diagram of a debug status register associated with the debug registers of FIG. 3, in accordance with one embodiment of the present invention.

FIG. 8 shows, in a tabular form, functionality of a portion of the debug status register of FIG. 7, in accordance with one embodiment of the present invention.

FIG. 9 is a diagram of a debug event resource control register associated with the data processing system of FIG. 1, in accordance with one embodiment of the present invention.

FIGS. 10-13 show, in tabular form, functionality of a portion of the debug event resource control register of FIG. 9.

FIGS. 14-15 show, in tabular form, software accessible resources based on exemplary settings of the debug control register of FIG. 4 and the debug event resource control register of FIG. 9.

FIG. 18 is a diagram illustrating an external debug command register, in accordance with one embodiment of the present invention.

FIG. 19 shows, in tabular form, functionality of a portion of the external debug command register of FIG. 18.

FIG. 20 illustrates, in tabular form, selected registers based on exemplary settings of the external debug command register.

DETAILED DESCRIPTION OF THE DRAWINGS

Figure 1:
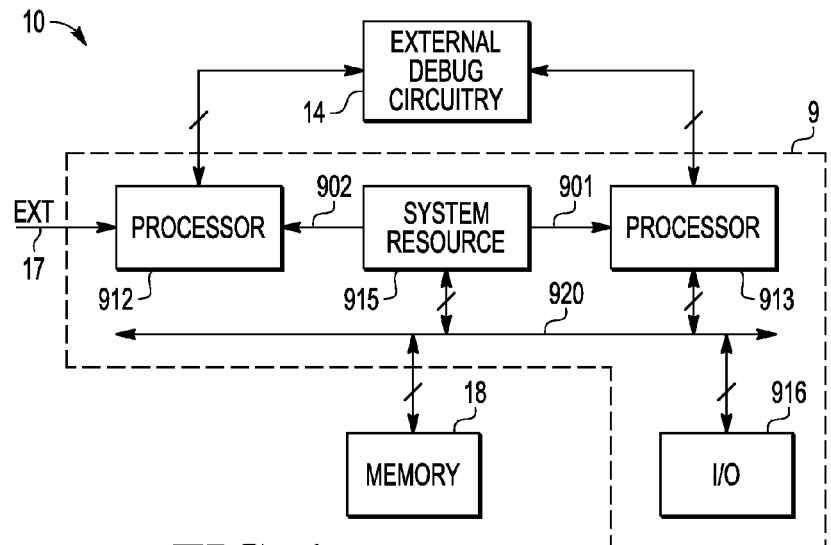
FIG. 1 is a block diagram of a data processing system, in accordance with one embodiment of the present invention.

In one embodiment, a common set of debug event resources is used to determine the occurrence of debug events that are owned exclusively by either an external debugger or by a resource internal to a data processor to the exclusion of the external debugger, referred to herein as an "internal resource". An example of an internal resource includes software debugger. The debug event resources can include control registers, status registers, and debug logic that determines the occurrence of debug events.

In one operating configuration, each debug event and their corresponding debug event resources are exclusively owned by either the external debugger or by an internal resource. Exclusive ownership of a particular debug event resource results in the owner servicing notifications from the event resource, and authorizes the owner to control the resource. In an alternate operating configuration, individual debug event resources can be either exclusively owned by the external debugger, or can be a jointly owned resource, referred to as a shared resource, that has its debug event notifications serviced by an internal resource and authorizes both the external debugger and the internal resource to control the debug event resources. In one embodiment, the shared resources are identified by the external debugger, which initially has exclusive ownership, writing to a debug register to identify those debug event resources that are shared, wherein debug event resources not identified as shared remain exclusively owned by the external debugger.

The debug event resources that detect debug events to be serviced by internal resources can generate an interrupt or watchpoint responsive to a condition indicating the debug event has occurred. Servicing of a debug interrupt can include execution of a software routine at the data processor, e.g., use of a software debugger. Servicing of a debug watchpoint can include transmission of the watchpoint to a particular internal resource of the data processor, such as to an output of the data processor, or to a register of the data processor. Debug events serviced by the external debugger cause the data processor to enter entry into external debug mode and to notifying an external debugger via a dedicated debug port of the data processor of the occurrence of a debug event.

Another embodiment disclosed herein provides for a signal received at debug circuitry of a processor to prevent an otherwise authorized request from an internal resource of the data processor from controlling a debug event resource. For example, authorized write requests from an internal resource of the data processor, e.g., by a software debugger, will be prevented based upon the state of the received signal, while authorized write request from the external debugger would be unaffected by the state of the received signal.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterisks (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Brackets are used herein to indicate the conductors of a bus or the bit locations of a value. For example, "bus 60 [7:0]" or "conductors [7:0] of bus 60" indicates the eight lower order conductors of bus 60, and "address bits [7:0]" or "ADDRESS [7:0]" indicates the eight lower order bits of an address value. The symbol "$" preceding a number indicates that the number is represented in its hexadecimal or base sixteen form. The symbol "%" or "0b" preceding a number indicates that the number is represented in its binary or base two form.

As used herein, the term "hardware debugger" is used synonymously with the term external debugger to refer to a device external the data processor that controls debug operations at the processor by communicating via a dedicated debug interface. The hardware debugger can be include hardware, software, and combinations thereof to direct debug operations within processor 912. In one embodiment, a hardware debugger directs debug operation within processor 912 via a debug bus.

As used herein the term "internal resource" as used with respect to a data processor refers to either software being executed by the data processor, or resources of the data processor other than those used to interface with the external debugger. By way of example, the present disclosure presumes the internal resource is software related to a software debugger.

FIG. 1 illustrates a data processing system 10 consistent with an embodiment of the invention. In one embodiment, data processing system 10 is a system-on-chip implemented on a single integrated circuit substrate. Alternatively, data processing system 10 cam include a plurality of integrated circuits. In the specific embodiment of FIG. 1, data processing system 10 includes external debug circuitry 14, a single integrated circuit 9 that includes various modules, and memory 18. Integrated circuit 9 includes a data processor unit (processor) 912, a processor 913, a system resource module 915 that is connected to processor 912 via interconnect 902, and to processor 913 via interconnect 903, and an I/O module 16, which may be connected via bus 20. In alternate embodiments, memory 18 may be any type of memory and may be located on the integrated circuit 9, or on a different integrated circuit than processor 912. Memory 18 may be any type of memory, such as, for example, a read only memory (ROM), a random access memory (RAM), non-volatile memory (e.g. Flash), etc. Also, memory 18 may be a memory or other data storage located within another peripheral or slave or on a different integrated circuit.

Figure 2:
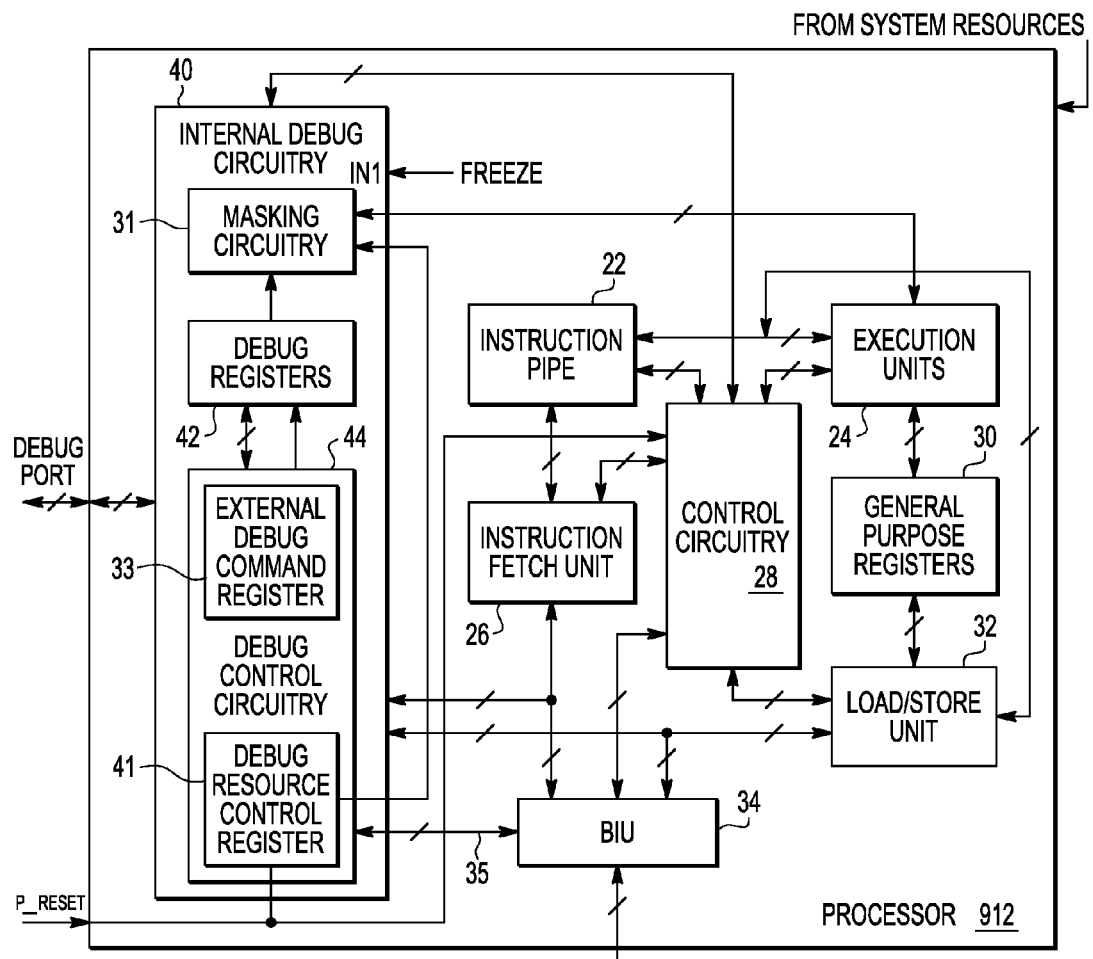
FIG. 2 is a block diagram of a processor associated with the data processing system of FIG. 1, in accordance with one embodiment of the present invention.

FIG. 2 is a block diagram of processor 912 associated with data processing system 10 of FIG. 1. Processor 912 may be implemented to perform operations in a pipelined fashion, and may include an instruction pipe 22, execution units 24, instruction fetch unit 26, control circuitry 28, general purpose registers 30, load/store unit 32, bus interface unit (BIU) 34, internal debug circuitry 40, and an input from system resources 915 that can be used to control operation of one or more features of the internal debug circuitry 40. Processor 912 may communicate with other components of data processing system 10 via bus 20 connected to BIU 34. Internal debug circuitry 40 may be connected to external debugging units implemented by the external debug circuitry 14, such as an IEEE ISTO-5001 compliant Nexus™ debugging unit via debug port shown in FIG. 2. Nexus™ is a trademark of Freescale Semiconductor, Inc. located in Austin, Tex. The debug port may be implemented using a serial interface, such as an industry standard JTAG TAP conforming to IEEE 1149, or may be implemented as a parallel port, a combination of serial and parallel ports, or as an Ethernet port. Internal debug circuitry 40 may include masking circuitry 31, debug registers 42, debug control circuitry 44, and an input labeled IN1 to receive an input from another location of the processor 912 or form external the processor 912, such as from system resources 915 or from external the integrated circuit 9. Debug control circuitry 44 may include an external debug command register 33 and a debug event resource control register 41 (DBERC0). Masking circuitry 31 communicates with debug registers 42, execution units 24 and receives information from debug event resource control register 41. Debug registers 42 may include bits grouped in fields for controlling, along with the signal received at IN1, the detection and notification of various debug related events, including instruction breakpoints, data breakpoints, watchpoints, and other messaging associated with debugging. These debugging resources may be shared between processor 912 and external debug circuitry 14. Also, debug control circuitry 44 may communicate addresses and data with BIU 34 by way of conductors 35.

In one embodiment, a hardware debugger refers to external debug hardware or circuitry that is external to processor 912 and directs debug operations within processor 912. In one embodiment, a hardware debugger directs debug operation within processor 912 via a debug port or alternatively, via a set of one or more debug signals.

Figure 3:
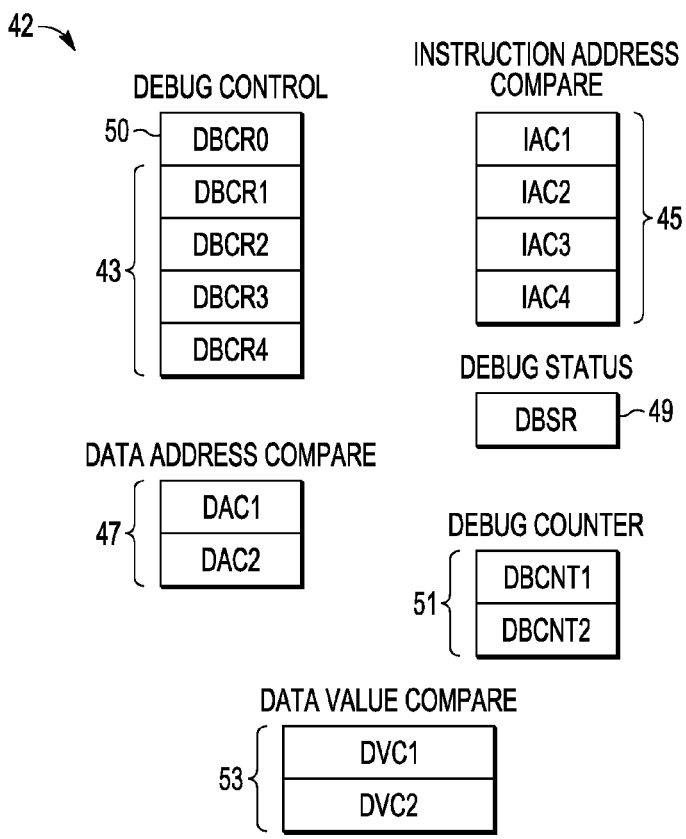
FIG. 3 is a diagram illustrating exemplary debug registers associated with the data processing system of FIG. 1.

Referring now to FIG. 3, registers within debug registers 42 may also be provided for storing various debug criteria, such as storing one or more address values, address ranges, and data match values for comparison to implement breakpoint and watchpoint events based on instruction accesses, or data accesses. These address and data values, along with various control criteria, are used to determine when processor 912 accesses one or more predetermined instruction addresses or data addresses for the purpose of generating a breakpoint or watchpoint event, which can cause processor 912 to begin exception processing for a debug exception when internal debug mode is active, or cause processor 912 to enter a debug halted mode in which it responds to commands provided by external debug circuitry 14 through the debug port of internal debug unit 40 (to, for example, external debug command register 33) when external debug mode is active. That is, debug registers 42 may be used to configure debug events. By way of example, debug registers 42 may include various debug control registers, including debug control register 50 (DBCR0) and other debug control registers 43 (DBCR1, DBCR2, DBCR3, and DBCR4). Debug registers 42 may further include instruction address compare registers 45 (IAC1 and IAC2). Instruction address compare registers 45 may store instruction addresses for address comparison purposes. Debug registers 42 may further include data address compare registers 47 (DAC1 and DAC2). Data address compare registers 47 may store data access addresses for address comparison purposes. Debug registers 42 may further include debug status register 49, debug counters 51 (DBCNT1 and DBCNT2), and data value compare registers 53 (DVC1 and DVC2). Debug registers 42 may be a part of the user's software programming model. Debug counters 51 may be configured to count-down when one or more count-enabled events occur. When a count value reaches zero, a debug count event may be signaled, and a debug interrupt may be generated, if enabled. Data value compare registers 53 may store data values for data comparison purposes.

In internal debug mode (when external debug mode is not enabled), these register resources are managed by internal resources (e.g. by debug software), and no external debug circuitry usage is required. Internal resources may configure the registers through data movement using move to and from special purpose register instructions which are programmers model software instructions to initialize the individual debug registers for performing software-based debugging activities, in which enabled debug events may cause software debug interrupts to occur. A software debugger may then perform various desired activity which is determined by the software programmer of data processing system 10. In this internal debug mode, the debug event resources of FIG. 3 are exclusively used and managed (i.e. owned) by the software debugger such that a hardware debugger does not have access to these resources.

In external debug mode, external debug circuitry 14 (i.e. a hardware debugger) is assigned exclusive ownership of the debug event resources of FIG. 3, and when a configured debug event occurs, processor 912 may stop executing software instructions, and then enter a halted state and wait for a command to be provided by external debug circuitry 14 (where this halted state may also be referred to as hardware debug mode). Software (such as debug software executed by processor 912) no longer has control of the debug event resources when external debug mode is enabled. External debug circuitry 14 may access the debug event resources, including debug registers 42, directly via the debug port (as shown in FIG. 2), which may be, for example, implemented as a JTAG TAP port. In one embodiment, debug registers 42 may be mapped as JTAG data registers with register selection encodings contained within one or more fields for the various JTAG instructions, which provide for read and write accesses to the registers by the debugger through JTAG IR and DR operations. As will be described in more detail below, in external debug mode, external debug circuitry 14 is able to allow software on processor 912 (e.g. a software debugger running on processor 912) to selectively manage a subset of the debug event resources. That is, external debug circuitry 14 is able to assign one or more debug event resources, through the use of debug event resource control register 41, to the software debugger to manage. For example, external debug circuitry 14 is able to allow particular debug control register fields within debug registers 42 to be managed by the software debugger. Debug events to be serviced by the software debugger result in an interrupt to the software debugger (assuming interrupts are enabled), while debug events which are managed by the hardware debugger result in entry into hardware debug mode in which processor 912 is halted and debugging is performed via the debug port by external debug circuitry 14. In this manner, debug control register fields and other debug event resources can be selectively managed or owned by a hardware debugger or software debugger when one or more resources are shared between a software debugger and the hardware debugger. Furthermore, by external debug circuitry 14 being able to assign one or more debug event resources for use by the software debugger, external debug circuitry 14 is capable of debugging the software debugger itself. The software debugger is authorized to access registers associated with debug events that it manages.

However, specific authorized access requests by the software debugger can be prevented based upon the state of the signal FREEZE. This allows the software debugger to service a debug event without risk of software errantly modifying a debug event resource in a way that could result in an undetected error condition. For example, a debug event can be used to provide a watchpoint that acts as a service request to peripheral, such as a watchdog timer, each time an instruction address stored at field IAC4 of registers 45 matches an instruction address accessed by processor 912. Once the watchdog timer and field IAC4 are initialized, the FREEZE signal can be asserted by the watchdog timer's servicing of the watchpoint to prevent the value at field IAC4 from being modified. This is advantageous in that modification of the value stored at the field IAC4 could result in the watchdog timer being serviced inadvertently, thus giving the appearance that the system is functioning normally, when in fact it is not. Therefore, as discussed in greater detail herein, in accordance with a specific embodiment of the present disclosure, there is a mechanism, such as a state machine or register field, that asserts the FREEZE signal to prevent modification of certain debug event resources from software modification even though the software is otherwise authorized to modify the resource.

Note that, as used herein, debug event resources may include more or less registers than those included in debug registers 42. For example, debug event resources may include registers to generate instruction breakpoints, data breakpoints, various execution event breakpoints, as well as control and status fields to configure the resources and to report status on various events. In addition to including one or more particular fields of a debug register, debug event resources may also include counters and comparators, as needed, to detect debug events. Also, sharing of a common set of control and status registers (such as debug registers 42), rather than having duplicate sets for a hardware debugger and a software debugger to manage, requires fewer processor 912 resources to be implemented, and this simplifies the programming model for the user of data processing system 10. Internal debug unit 40 monitors activity within processor 912 and in response to detecting one or more predetermined conditions based on stored debug configuration information, may generate one or more data breakpoint events, instruction breakpoint events, instruction execution events such as a branch or trap taken event, an instruction completion event, and the like. In this manner of operation, processor 912 functions as can be appreciated by those skilled in the art.

Figure 4:
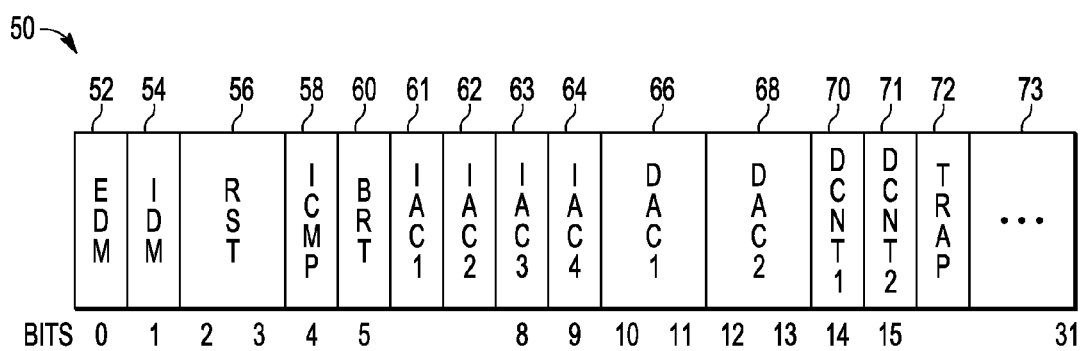
FIG. 4 is a diagram of a debug control register associated with the debug registers of FIG. 3, in accordance with one embodiment of the present invention.

FIG. 4 is a diagram of a debug control register 50 (DBCR0 of FIG. 3) associated with the data processing system of FIG. 1. Debug control register 50 may be included as part of debug registers 42, which may further be included as part of internal debug unit 40. Debug control register 50 may be used to store debug configuration information. Although FIG. 4 illustrates a specific embodiment of the present invention which uses specific bit fields, alternate embodiments of the present invention may use different bit fields having different numbers of bits in each field. The specific bit fields depicted in FIG. 4 are shown only for illustrative purposes. By way of example, debug control register 50 may include 32 bits. Debug control register 50 may include bit fields labeled as: EDM 52, IDM 54, RST 56, ICMP 58, BRT 60, IAC1 61, IAC2 62, IAC3 63, IAC4 64, DAC1 66, DAC2 68, DCNT1 70, DCNT2 71, and TRAP 72. These bit fields are merely exemplary and debug control register 50 may include fewer or additional bit fields. In addition, these bit fields may be arranged differently. Also, note that each field may be referred to as a bit or bits or as a field. Debug control register 50 may also include reserved bit field 73 which may be used in the future. The functionality of the various bit fields is explained with respect to FIGS. 5 and 6 below. By way of example, debug control register 50 may be a writeable register that may also be readable and which may be part of the user's software programming model. In alternate embodiments of the present invention, debug control register 50 may not be a control register in the user's software programming model, but instead may be implemented outside of the user's software programming model. Any type of storage circuitry may be used to implement debug control register 50.

FIG. 5 shows, in a tabular form, functionality of a portion of debug control register 50 of FIG. 4. EDM bit 52 may indicate whether the external debug mode is enabled or disabled. When EDM bit 52 is set to 1, for example, control registers, such as debug control register 50 are placed under exclusive control of external debug circuitry 14 and data processing system 10 software cannot write information to these control registers. Alternatively, when EDM bit 52 is set to 1, software cannot write to specific portions of debug control registers. Additionally, EDM bit 52 is used to selectively block certain reset events from clearing information stored in debug control register 50 and other debug event resources, which may contain debug control and setup information. Also, when EDM bit 52 is set to 1, debug event resource control register 41 can be used by external debug circuitry 14 to allocate a subset of control register fields for software to manage. IDM bit 54 may indicate whether internal debug mode is enabled or disable, thus indicating whether debug exceptions are enabled or disabled. RST bits 56 may be used to control reset functions. ICMP bit 58 may be used to indicate whether instruction complete debug events are enabled or disabled. BRT bit 60 may be used to indicate whether branch taken debug events are enabled or disabled. IAC1 bit 61 may be used to indicate whether instruction address compare 1 debug events are enabled or disabled. IAC2 bit 62 may be used to indicate whether instruction address compare 2 debug events are enabled or disabled. IAC3 bit 63 may be used to indicate whether instruction address compare 3 debug events are enabled or disabled. IAC4 bit 64 may be used to indicate whether instruction address compare 4 debug events are enabled or disabled.

With reference now to FIG. 6, FIG. 6 shows, in a tabular form, functionality of a portion of the debug control register 50 of FIG. 4. DAC1 bits 66 may be used to indicate whether data address compare 1 debug events are enabled or disabled. If enabled, DAC1 bits 66 also indicates for which type of storage accesses data address compare 1 debug events are enabled (for example, for store-type data storage accesses, for load-type data storage accesses, or for either load-type or store-type data storage accesses). DAC2 bits 68 may be used to indicate whether data address compare 2 debug events are enabled or disabled. If enabled, DAC2 bits 68 also indicates for which type of storage accesses data address compare 1 debug events are enabled (for example, for store-type data storage accesses, for load-type data storage accesses, or for either load-type or store-type data storage accesses). DCNT1 bit 70 may be used to indicate whether a debug counter 1 debug event is enabled or not. DCNT2 bit 71 may be used to indicate whether a debug counter 2 debug event is enabled or not. TRAP bit 72 may be used to indicate whether a trap taken debug event is enabled or not. Bits 73 (17:31) may be reserved for future use. Although FIGS. 5 and 6 describe a specific number of bit fields for providing different configuration information associated with debug events, different number of bit fields than shown in these figures may also be used.

FIG. 7 is a diagram of a debug status register 49 associated with the data processing system of FIG. 1. Debug status register 49 may be included as part of debug registers 42, which may further be included as part of internal debug unit 40. Debug status register 49 may be used to store status information on debug events. In one embodiment, when a bit in the debug status register 49 is set to '1', a corresponding control signal is generated which is used to either signal entry into a debug halted mode (for debug events serviced by a hardware debugger) or is used to generate a debug interrupt request to the processor (for software debug events). Although FIG. 7 illustrates a specific embodiment of the present invention which uses specific bit fields, alternate embodiments of the present invention may use different bit fields having different numbers of bits in each field. The specific bit fields depicted in FIG. 7 are shown only for illustrative purposes. By way of example, debug status register 49 may include 32 bits. Debug status register 49 may include bit fields labeled as: IDE 76, ICMP 78, BRT 80, IAC1 82, IAC2 84, IAC3 86, IAC4 88, DAC1R 90, DAC1W 92, DAC2R 94, DAC2W 96, TRAP 97, DCNT1 98, DCNT2 99, and software dedicated bits 101. These bit fields are merely exemplary and debug status register 49 may include fewer or additional bit fields. In addition, these bit fields may be arranged differently. Also, note that each field may be referred to as a bit or bits or as a field. Debug status register 49 may also include reserved bit fields 100, which may be used in the future. The functionality of the various bit fields is explained with respect to FIG. 8 below. Also, in referring to debug status register 49, setting a bit refers to storing a logic level one and clearing a bit refers to storing a logic level zero. By way of example, debug status register 49 may be a register whose bits are set via a hardware debugger, and read and cleared via a software debugger and which may be part of the user's software programming model. In alternate embodiments of the present invention, debug status register 49 may not be in the user's software programming model, but instead may be implemented outside of the user's software programming model. In one embodiment, debug status bits of debug status register 49 are set by debug events only while internal debug mode is enabled or external debug mode is enabled. In one embodiment, when debug interrupts are enabled in internal debug mode, a set bit in debug status register 49 may cause a debug interrupt to be generated, where the debug interrupt handler is responsible for clearing debug status register 49 bits prior to returning to normal execution. In one embodiment, when in external debug mode, the debug status bits of debug status register 49 are set by the hardware debugger owned debug events. If the hardware debugger has assigned any resources to the software debugger, then the debug status bits corresponding to those assigned resources are set by the software debugger-owned debug events, where, if interrupts are enabled, a set bit owned by the software debugger may cause an interrupt request signal to be generated and a debug interrupt to be taken and handled by the software debugger. Correspondingly, a set bit owned by a hardware debugger may cause a debug mode request signal to be generated and entry into a debug halted mode to occur, and be handled by the hardware debugger. (Note that hardware debugger-owned resources may also be referred to as hardware-managed resources and the software debugger-owned resources may also be referred to as software-managed resources.) Furthermore, any type of storage circuitry may be used to implement debug status register 49.

FIG. 8 shows, in a tabular form, functionality of debug status register 49 of FIG. 7. IDE bit 76 is used to indicate occurrence of an imprecise debug event and thus may be set to one if debug exceptions are disabled and a debug event causes its respective debug status register bit to be set to one. That is, although a debug event may occur, debug exceptions may remain disabled because an interrupt cannot yet occur due to a current state of the processor 912 pipeline. ICMP bit 78 may be set to one if an instruction complete debug event occurred. BRT bit 80 may be set to one if a branch taken debug event occurred. IAC1 bit 82 may be set to one if an IAC1 debug event occurred. IAC2 bit 84 may be set to one if an IAC2 debug event occurred. IAC3 bit 86 may be set to one if an IAC3 debug event occurred. IAC4 bit 88 may be set to one if an IAC4 debug event occurred. DAC1 R bit 90 may be set to one if a read-type DAC1 debug event occurred while DAC1 bits 66 equal %10 or %11 (indicating that DAC1 debug events are enabled for load-type data storage accesses, as shown in FIG. 6). DAC1 W bit 92 may be set to one if a write-type DAC1 debug event occurred while DAC1 bits 66 equal %01 or %11 (indicating that DAC1 debug events are enabled for store-type data storage accesses, as shown in FIG. 6). DAC2 R bit 94 may be set to one if a read-type DAC2debug event occurred while DAC2 bits 68 equal %10 or %11 (indicating that DAC2debug events are enabled for load-type data storage accesses, as shown in FIG. 6). DAC2 W bit 96 may be set to one if a write-type DAC2debug event occurred while DAC2 bits 68 equal %01 or %11 (indicating that DAC2debug events are enabled for store-type data storage accesses, as shown in FIG. 6). TRAP bit 97 may be set to one if a trap taken debug event occurred. DCNT1 bit 98 may be set to 1 if a DCNT 1 debug event occurred. DCNT2 bit 99 may be set to one if a DCNT 2 debug event occurred. In one embodiment, bits 14 to 29 are reserved for possible future use. Also, in one embodiment, bits 101 are software dedicated bits, in which only software is able to access them.

FIG. 9 is a diagram of debug event resource control register 41 associated with the data processing system of FIG. 1. Debug event resource control register 41 may be used to control resource allocation when external debug mode is enabled (e.g. when EDM bit 52 of debug control register 50 is set to 1). Debug event resource control register 41 provides a mechanism for the hardware debugger (e.g. external debug circuitry 14) to share debug event resources with the software debugger. Individual resources are allocated based on the settings of debug event resource control register 41 when external debug mode is enabled. In one embodiment, when external debug mode is enabled (e.g. when EDM bit 52 of debug control register 50 is set to 1), the debug event resources (e.g. debug registers 42) are initially placed under sole control of the hardware debugger and the software debugger can no longer write to these resources. The hardware debugger can then assign one or more resources back to the software debugger via debug event resource control register 41 while retaining usage of the remaining resources. In this manner, debug operations directed by software debugger and debug operations directed by the hardware debugger can contemporaneously occur in external debug mode. That is, the hardware debugger and the software debugger can operate contemporaneously. When external debug mode is disabled (e.g. when EDM bit 52 of debug control register 50 is set to 0), the settings in debug event resource control register 41 are ignored.

In one embodiment, hardware debugger-owned resources which generate debug events cause entry into hardware debug mode, while the software debugger-owned resources which generate debug events act as if they occurred in internal debug mode, thus causing debug interrupts to occur if IDM bit 54 is set to 1 and if interrupts are enabled. In one embodiment, debug event resource control register 41 is controlled via the debug port and is read-only to the software debugger. Also, debug status bits in debug status register 49 are set by the software debugger-owned debug events only while internal debug mode is enabled. That is, when debug interrupts are enabled (and when IDM bit 54 in debug control register 50 is set to 1 and EDM bit 52 in debug control register 50 is set to 0, or when both IDM bit 54 and EDM bit 52 in debug control register 50 are set to 1 and the software debugger is allocated one or more debug event resources via debug event resource control register 41), a set bit in debug status register 49 which corresponds to a the software debugger-owned debug event will cause a debug interrupt to be generated.

Although FIG. 9 illustrates a specific embodiment of the present invention which uses specific bit fields, alternate embodiments of the present invention may use different bit fields having different numbers of bits in each field. The specific bit fields depicted in FIG. 9 are shown only for illustrative purposes. Furthermore, as with any of the registers described herein, more or less registers may be used to store the data. By way of example, debug event resource control register 41 may include 32 bits. Debug event resource control register 41 may include bit fields labeled as: IDM 112, RST 114, UDE 116, ICMP 118, BRT 120, IRPT 122, TRAP 124, IAC1 126, IAC2 128, IAC3 130, IAC4 132, DAC1 134, DAC2 138, RET 142, DEVT1 146, DEVT2 148, DCNT1 150, DCNT2 152, CIRPT 154, CRET 156 BKPT 158, and FT 162. These bit fields are merely exemplary and debug event resource control register 41 may include fewer or additional bit fields. In addition, these bit fields may be arranged differently. Also, note that each field may be referred to as a bit or bits or as a field. Debug event resource control register 41 may also include reserved bit fields 110, 136, 140, 144, and 160, which may be used in the future. The functionality of the various bit fields is explained with respect to FIGS. 10-13 below.

FIG. 10 shows, in a tabular form, functionality of a portion of debug event resource control register 41 (DBERC0) of FIG. 9. IDM bit 112 provides internal debug mode control. When IDM bit 112 is set to 0, internal debug mode may not be enabled by the software debugger. That is, IDM bit 54 in debug control register 50 (DBCR0) is owned exclusively by the hardware debugger. A Move to Special Purpose Register (mtspr) instruction to debug control registers 50 and 43 (DBCR0-DBCR4), to debug counter registers 51 (DBCNT1 and DBCNT2), or to debug status register 49 (DBSR) is always ignored. Also, no resource sharing occurs, regardless of the setting of other fields in DBERC0 41. That is, the hardware debugger exclusively owns all resources. Also, a Move from Special Purpose Register (mfspr) instruction from any of debug registers 42 by software returns 0. When IDM bit 112 is set to 1, internal debug mode may be enabled by the software debugger. That is, IDM bit 54 in DBCR0 50 and IDE bit 76 in DBSR 49 are owned by the software debugger and are thus the software debugger readable/writeable. Also, hardware debugger-managed status and control bits in DBSR 49 are masked from the software debugger access and read as 0, and the software debugger writes to hardware debugger-managed bits in DBCR0-DBCR4, DBCNT, and DBSR via an mtspr instruction are ignored. Note that by setting IDM bit 112 to 1, the hardware debugger is able to assign resources for use by the software debugger, where these resources assigned to the software debugger may be defined by the other fields in DBERC0 41. RST bit 114 provides reset field control. When RST bit 114 is set to 0, RST bits 56 of DBCR0 50 are owned exclusively by the hardware debugger. Also, no mtspr access by the software debugger to RST bits 56 is allowed, and an mfspr access by the software debugger returns 0. When RST bit 114 is set to 1, RST bits 56 of DBCR0 50 are accessible by a software debugger. That is, RST bits 56 are the software debugger readable and writeable.

Still referring to FIG. 10, UDE bit 116 allows for the assignment of ownership (or management) of an unconditional debug event to the software debugger. When UDE bit 116 is set to 0, the unconditional debug event is owned by the hardware debugger. The software debugger cannot access the UDE field in DBSR 49 (UDE field not shown) via an mtspr instruction and an mfspr access by the software debugger returns 0. When UDE bit 116 is set to 1, the unconditional debug event is owned by the software debugger. In this case, the UDE field in DBSR 49 is the software debugger readable and writeable. ICMP bit 118 allows for the assignment of ownership (or management) of an instruction complete debug event to the software debugger. When ICMP bit 118 is set to 0, the instruction complete debug event is owned by the hardware debugger. There is no mtspr access by the software debugger to ICMP field 58 in DBCR0 50 or ICMP field 78 in DBSR 49, and an mfspr access by the software debugger returns 0. When ICMP bit 118 is set to 1, the instruction complete debug event is owned by the software debugger. In this case, ICMP field 58 in DBCR0 50 and ICMP field 78 in DBSR 49 are the software debugger readable and writeable. BRT bit 120 allows for the assignment of ownership (or management) of a branch taken debug event to the software debugger. When BRT bit 120 is set to 0, the branch taken debug event is owned by the hardware debugger. There is no mtspr access by the software debugger to BRT field 60 in DBCR0 50 or BRT field 80 in DBSR 49, and an mfspr access by the software debugger returns 0. When BRT bit 120 is set to 1, the branch taken debug event is owned by the software debugger. In this case, BRT field 60 in DBCR0 50 and BRT field 80 in DBSR 49 are software debugger readable and writeable.

FIG. 11 shows, in a tabular form, functionality of a portion of debug event resource control register 41 (DBERC0) of FIG. 9. IRPT bit 122 allows for the assignment of ownership (or management) of an interrupt taken debug event to the software debugger. When IRPT bit 122 is set to 0, the interrupt taken debug event is owned by the hardware debugger. There is no mtspr access by the software debugger to an IRPT field (not shown) in DBCR0 50 or an IRPT field (not shown) in DBSR 49, and an mfspr access by the software debugger returns 0. When IRPT bit 122 is set to 1, the interrupt taken debug event is owned by the software debugger. In this case, the IRPT field in DBCR0 and the IRPT field in DBSR 49 are software debugger readable and writeable. TRAP bit 124 allows for the assignment of ownership (or management) of a trap taken debug event to the software debugger. When TRAP bit 124 is set to 0, the trap taken debug event is owned by the hardware debugger. There is no mtspr access by the software debugger to TRAP field 72 in DBCR0 50 or TRAP field 97 in DBSR 49, and an mfspr access by the software debugger returns 0. When TRAP bit 124 is set to 1, the trap taken debug event is owned by the software debugger. In this case, the TRAP field 72 in DBCR0 and TRAP field 97 in DBSR 49 are software debugger readable and writeable.

Still referring to FIG. 11, IAC1 bit 126 allows for the assignment of ownership (or management) of instruction address compare 1 debug event to the software debugger. When IAC1 bit 126 is set to 0, the instruction address compare 1 debug event is owned by the hardware debugger. There is no mtspr access by the software debugger to IAC1 control and status fields (e.g. IAC1 field 61 in DBCR0 50 and IAC1 field 82 in DBSR 49), and an mfspr access by the software debugger returns 0. When IAC1 bit 126 is set to 1, the instruction address compare 1 debug event is owned by the software debugger. In this case, the IAC1 control and status fields (e.g. IAC1 field 61 in DBCR0 and IAC1 field 82 in DBSR 49) are software debugger readable and writeable. IAC2 bit 128 allows for the assignment of ownership (or management) of instruction address compare 2 debug event to the software debugger. When IAC2 bit 128 is set to 0, the instruction address compare 2 debug event is owned by the hardware debugger. There is no mtspr access by the software debugger to IAC2 control and status fields (e.g. IAC2 field 62 in DBCR0 50 and IAC2 field 84 in DBSR 49), and an mfspr access by the software debugger returns 0. When IAC2 bit 128 is set to 1, the instruction address compare 2 debug event is owned by the software debugger. In this case, the IAC2 control and status fields (e.g. IAC2 field 62 in DBCR0 and IAC2 field 84 in DBSR 49) are software debugger readable and writeable. IAC3 bit 130 allows for the assignment of ownership (or management) of instruction address compare 3 debug event to the software debugger. When IAC3 bit 130 is set to 0, the instruction address compare 3 debug event is owned by the hardware debugger. There is no mtspr access by the software debugger to IAC3 control and status fields (e.g. IAC3 field 63 in DBCR0 50 and IAC3 field 86 in DBSR 49), and an mfspr access by the software debugger returns 0. When IAC3 bit 130 is set to 1, the instruction address compare 3 debug event is owned by the software debugger. In this case, the IAC3 control and status fields (e.g. IAC3 field 63 in DBCR0 and IAC3 field 86 in DBSR 49) are software debugger readable and writeable. IAC4 bit 132 allows for the assignment of ownership (or management) of instruction address compare 4 debug event to the software debugger. When IAC4 bit 132 is set to 0, the instruction address compare 4 debug event is owned by the hardware debugger. There is no mtspr access by the software debugger to IAC4 control and status fields (e.g. IAC4 field 64 in DBCR0 50 and IAC4 field 88 in DBSR 49), and an mfspr access by the software debugger returns 0. When IAC4 bit 132 is set to 1, the instruction address compare 4 debug event is owned by the software debugger. In this case, the IAC4 control and status fields (e.g. IAC4 field 64 in DBCR0 and IAC4 field 88 in DBSR 49) are software debugger readable and writeable.

FIG. 12 shows, in a tabular form, functionality of a portion of debug event resource control register 41 (DBERC0) of FIG. 9. DAC1 bit 134 allows for the assignment of ownership (or management) of data address compare 1 debug event to the software debugger. When DAC1 bit 134 is set to 0, the data address compare 1 debug event is owned by the hardware debugger. There is no mtspr access by the software debugger to DAC1 control and status fields (e.g. DAC1 field 66 in DBCR0 50 and DAC1 R field 90 and DAC1 W field 92 in DBSR 49), and an mfspr access by the software debugger returns 0. When DAC1 bit 134 is set to 1, the data address compare 1 debug event is owned by the software debugger. In this case, the DAC1 control and status fields (e.g. DAC1 field 66 in DBCR0 50 and DAC1 R field 90 and DAC1 W field 92 in DBSR 49) are the software debugger debugger readable and writeable. DAC2 bit 138 allows for the assignment of ownership (or management) of data address compare 2 debug event to the software debugger. When DAC2 bit 138 is set to 0, the data address compare 2 debug event is owned by the hardware debugger. There is no mtspr access by the software debugger to DAC2control and status fields (e.g. DAC2field 68 in DBCR0 50 and DAC2 R field 94 and DAC2 W field 96 in DBSR 49), and an mfspr access by the software debugger returns 0. When DAC2 bit 138 is set to 1, the data address compare 2 debug event is owned by the software debugger. In this case, the DAC2control and status fields (e.g. DAC2field 68 in DBCR0 50 and DAC2 R field 94 and DAC2 W field 96 in DBSR 49) are software debugger readable and writeable.

Still referring to FIG. 12, RET bit 142 allows for the assignment of ownership (or management) of a return debug event to the software debugger. When RET bit 142 is set to 0, the return debug event is owned by the hardware debugger. There is no mtspr access by the software debugger to a RET field (not shown) in DBCR0 50 and a RET field (not shown) in DBSR 49, and an mfspr access by the software debugger returns 0. When RET bit 142 is set to 1, the return debug event is owned by the software debugger. In this case, the RET field in DBCR0 50 and the RET field in DBSR 49 are software debugger readable and writeable. DEVT1 bit 146 allows for the assignment of ownership (or management) of an external debug event 1 debug event to the software debugger. When DEVT1 bit 146 is set to 0, the external debug event 1 debug event is owned by the hardware debugger. There is no mtspr access by the software debugger to a DEVT1 field (not shown) in DBCR0 50 and a DEVT1 field (not shown) in DBSR 49, and an mfspr access by the software debugger returns 0. When DEVT1 bit 146 is set to 1, the external debug event 1 debug event is owned by the software debugger. In this case, the DEVT1 field in DBCR0 50 and the DEVT1 field in DBSR 49 are software debugger readable and writeable. DEVT2 bit 148 allows for the assignment of ownership (or management) of an external debug event 2 debug event to the software debugger. When DEVT2 bit 148 is set to 0, the external debug event 2 debug event is owned by the hardware debugger. There is no mtspr access by the software debugger to a DEVT2 field (not shown) in DBCR0 50 and a DEVT2 field (not shown) in DBSR 49, and an mfspr access by the software debugger returns 0. When DEVT2 bit 148 is set to 1, the external debug event 2 debug event is owned by the software debugger. In this case, the DEVT2 field in DBCR0 50 and the DEVT2 field in DBSR 49 are software debugger readable and writeable.

FIG. 13 shows, in a tabular form, functionality of a portion of debug event resource control register 41 (DBERC0) of FIG. 9. DCNT1 bit 150 allows for the assignment of ownership (or management) of debug counter 1 debug event to the software debugger. When DCNT1 bit 150 is set to 0, the debug counter 1 debug event is owned by the hardware debugger. There is no mtspr access by the software debugger to counter 1 control and status fields (e.g. DCNT1 field 70 in DBCR0 50 and DCNT1 field 98 in DBSR 49), and an mfspr access by the software debugger returns 0. When DCNT1 bit 150 is set to 1, the debug counter 1 debug event is owned by the software debugger. In this case, the counter 1 control and status fields (e.g. DCNT1 field 70 in DBCR0 50 and DCNT1 field 98 in DBSR 49) are software debugger readable and writeable. DCNT2 bit 152 allows for the assignment of ownership (or management) of debug counter 2 debug event to the software debugger. When DCNT2 bit 152 is set to 0, the debug counter 2 debug event is owned by the hardware debugger. There is no mtspr access by the software debugger to counter 2 control and status fields (e.g. DCNT2 field 71 in DBCR0 50 and DCNT2 field 99 in DBSR 49), and an mfspr access by the software debugger returns 0. When DCNT2 bit 152 is set to 1, the debug counter 2 debug event is owned by the software debugger. In this case, the counter 2 control and status fields (e.g. DCNT2 field 71 in DBCR0 50 and DCNT2 field 99 in DBSR 49) are software debugger readable and writeable. CIRPT bit 154 allows for the assignment of ownership (or management) of critical interrupt taken debug event to the software debugger. When CIRPT bit 154 is set to 0, the critical interrupt taken debug event is owned by the hardware debugger. There is no mtspr access by the software debugger to a CIRPT field (not shown) in DBCR0 50 and a CIRPT field (not shown) in DBSR 49, and an mfspr access by the software debugger returns 0. When CIRPT bit 154 is set to 1, the critical interrupt taken debug event is owned by the software debugger. In this case, the CIRPT field in DBCR0 50 and the CIRPT field in DBSR 49 are the software debugger debugger readable and writeable. CRET bit 156 allows for the assignment of ownership (or management) of critical return debug event to the software debugger. When CRET bit 156 is set to 0, the critical return debug event is owned by the hardware debugger. There is no mtspr access by the software debugger to a CRET field (not shown) in DBCR0 50 and a CRET field (not shown) in DBSR 49, and an mfspr access by the software debugger returns 0. When CRET bit 156 is set to 1, the critical return debug event is owned by the software debugger. In this case, the CRET field in DBCR0 50 and the CRET field in DBSR 49 are software debugger readable and writeable.

Still referring to FIG. 13, BKPT bit 158 provides breakpoint instruction debug control. When BKPT bit 158 is set to 0, the breakpoint is owned by the hardware debugger. Execution of a breakpoint (bkpt) instruction (an instruction with all 0's opcode) results in entry into debug mode in which a hardware debugger can direct debug operations. When BKPT bit 158 is set to 1, the breakpoint is owned by the software debugger. Execution of a bkpt instruction results in an illegal instruction exception. FT bit 162 provides freeze timer debug control. When FT bit 162 is set to 0, an FT field (not shown) of DBCR0 50 is owned by the hardware debugger with no access allowed by the software debugger. When FT bit 162 is set to 1, the FT field is owned by the software debugger and is therefore software debugger readable and writeable. In FIGS. 10-13, bit fields 110, 136, 140, 144, and 160 may be reserved for future use.

Therefore, as described above, when processor 912 initially enters the external debug mode, all resources are exclusively assigned to the hardware debugger (e.g. external debug circuitry 14). However, through the use of debug event resource control register 41, the hardware debugger can assign resources back to the software debugger for exclusive servicing by the software debugger. That is, the hardware debugger can enable availability of a first portion of the debug event resources for use by the software debugger where a second portion of the debug event resources are committed for exclusive use by the hardware debugger (where the first and second portions are mutually exclusive). As seen in the descriptions of FIGS. 10-13, by assigning a debug event or control to the software debugger, the software debugger has access to those debug event resources necessary to manage that debug event or control. In one embodiment, the software debugger is given access only to those resources necessary to manage that debug event or control. For example, if the hardware debugger sets each of bits IAC3 bit 1230 and IAC4 bit 132 to a 1 (and sets IDM bit 112 to a 1 to allow for the sharing of resources), those status and control registers, and any other resources, necessary for managing those instruction address compare debug events are assigned to the software debugger. For example, the software debugger would have access to IAC3 field 63 and IAC4 field 64 in DBCR0 50, to IAC4 field 86 through IAC4 field 88 in DBSR 49, and to fields IAC3 through IAC4 of 45, which contain the compare addresses. In this manner, the software debugger can then write to these fields to enable a debug event resource associated with either an IAC3 or an IAC4 debug event (or both debug events) by setting the appropriate fields, as needed, to configure the debug events. However, if the rest of the bit fields in DBERC0 remain set to 0, then the hardware debugger has exclusive use of the remaining resources, such as fields associated with IAC1 and IAC2. In this manner, the hardware debugger and software debugger may contemporaneously service debug events during external debug mode where the software debugger is limited to accessing only those resources that were assigned by the hardware debugger. Furthermore, the software debugger running on processor 912 would not be able to access any of the other resources which remain exclusively owned by the hardware debugger. Therefore, note that the software debugger, in being assigned ownership of a debug event, is given access to particular registers or to particular fields of registers, as needed. In this manner, the hardware debugger is able to enable availability of a first portion of the debug event resources for use by the software debugger while committing to itself a second portion of the debug event resources, where the first and second portions are mutually exclusive.

FIGS. 14 and 15 illustrate, in tabular form, those resources that are the software debugger accessible in response to particular settings of DBERC0 41 and input signal received at input IN1. Referring to row 172, note that if external debug mode is not enabled (if EDM bit 52 is set to 0), all resources are exclusively owned and thus accessible by the software debugger. For the remaining rows of FIGS. 14 and 15, as shown in rows 176, 178, 180, 182, 184, 186, 188, 190, 192, 194, 196, 198, 200, 202, 204, 206, 208, and 210, external debug mode is enabled (EDM bit 52 is set to 1) and IDM bit 112 of DBERC0 41 is set to 1, such that the remaining fields of DBERC0 41 assign particular resources to the software debugger. For example, in order to allow the software debugger to own the instruction address compare 1 and 2 debug events (as was discussed in the example of the previous paragraph), the settings of row 186 or row 188 or both could be used, where the column entitled "software accessible" indicates which debug event resources are available for use by the software debugger based on which of IAC1 bit 126 or IAC2 bit 128 of DBERC0 41 are set to 1. Note that other fields in other debug control registers 43 (such as IAC1 US and IAC1 ER fields of DBCR1) can be assigned for use by the software debugger in addition to those fields discussed in reference to DBCR0 50.

Row 195 indicates that the debug event resource that is associated with IAC4 has been assigned to the software debugger by the hardware debugger. Because the signal at input IN1 is negated, all registers related to the debug event resources of IAC4 are read/write accessible by the software debugger. However, when the signal at input IN1 is asserted concurrently with determining whether to prevent an authorized access, one or more of the debug event resources associated with IAC4 are not writeable by the software debugger, but can remain readable. For example, as indicated at row 195, the field IAC4 of registers 45, and the register DBCR0 50 are read only in response to the signal at IN1 being asserted. It will be appreciated that in other embodiments, assertion of the signal at IN1 could make a register unreadable, or unreadable and unwriteable. Furthermore, additional input signals (IN1) could be included to prevent specific access types (e.g., read and write), to prevent access to specific portions of a debug event resource, to prevent access to other resources, and combinations thereof.

Figure 16:
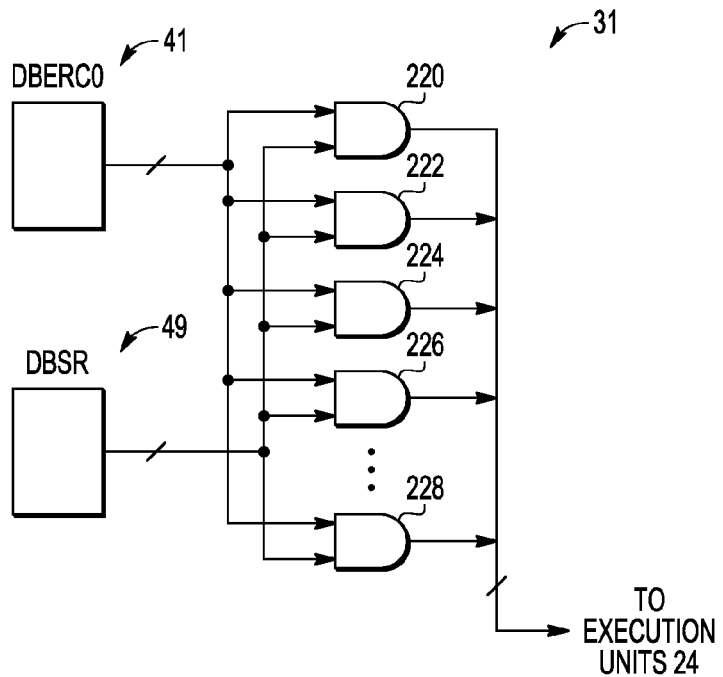
FIGS. 16-17 show, in partial schematic and partial block diagram form, portions of masking circuitry associated with the processor of FIG. 2, in accordance with one embodiment of the present invention.
Figure 17:
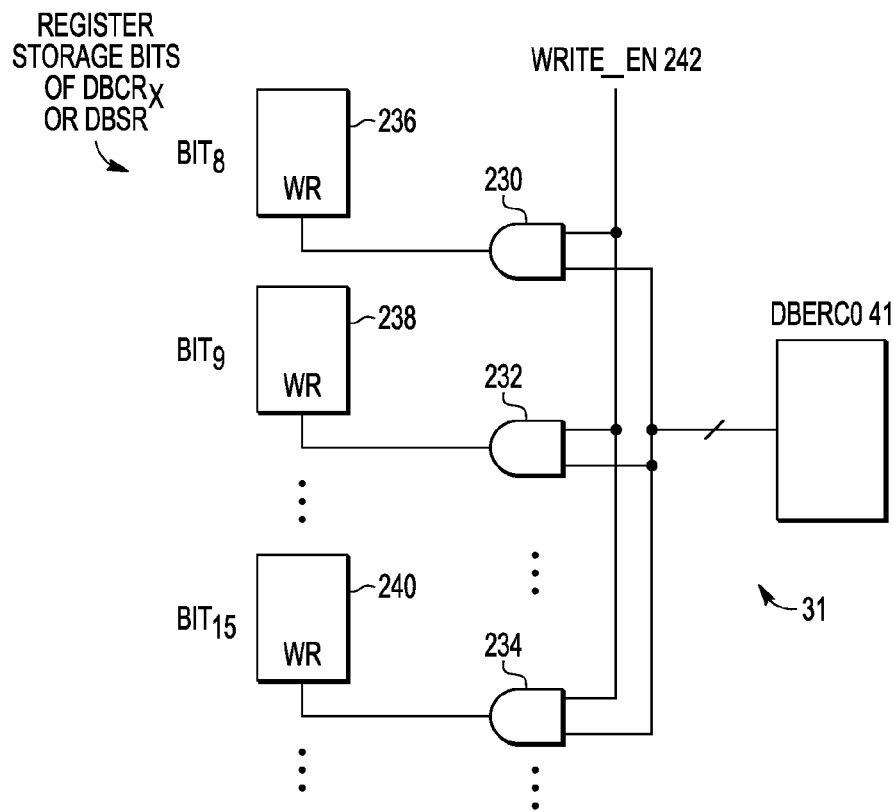

FIGS. 16 and 17 illustrate portions of masking circuitry 31, in accordance with one embodiment of the present invention. FIG. 16 illustrates a portion of the read path from debug registers 42 to execution units 24, such as when executing a mfspr instruction. As described above in reference to FIGS. 10-13, when a bit field corresponding to a particular debug event is not asserted, the particular debug event is hardware debugger-owned in which an mfspr access by the software debugger returns a 0. However, when the bit field corresponding to a particular debug event is asserted, the particular debug event is the software debugger-owned in which it is readable and writeable by the software debugger. In this manner, portions of DBSR 49 can be prevented from being read by the software debugger during execution. Therefore, referring to FIG. 16, each AND gate 220, 222, 224, 226, and 228 receives a first bit input from DBERC0 41 and a corresponding second bit input from DBSR 49. That is, each AND gate receives a bit field from DBERC0, which, for example, corresponds to a particular debug event and also receives the bit field from DBSR 49 which corresponds to that particular debug event (i.e. which reports the result of that particular debug event). For example, AND gate 222 may receive IAC1 bit 126 from DBERC0 41 as a first input and IAC1 bit 82 from DBSR 49 as a second input. If the input from DBERC0 41 to an AND gate is a "1" (indicating that the corresponding debug event is the software debugger-owned), the output of that AND gate will reflect the value of the corresponding bit field from DBSR 49 which is provided as the second input to the AND gate. However, if the input from DBERC0 41 to an AND gate is a "0", then regardless of the value input from DBSR 49, the output of the AND gate will be 0. In this manner, an mfspr access will always return a zero when the corresponding bit in DBERC0 41 is negated.

FIG. 17 illustrates a portion of the write path execution units 24 to debug registers 42. As described above in reference to FIGS. 10-13, when a bit field corresponding to a particular debug event is not asserted, the particular debug event is hardware-owned in which there is no mtspr access by the software debugger. That is, the software debugger cannot write to the bit field. However, when the bit field corresponding to a particular debug event is asserted, the particular debug event is the software debugger-owned in which it is readable and writeable by the software debugger. Therefore, referring to FIG. 17, each AND gate 230, 232, and 234 receives a write_en signal 242 as a first input and a corresponding bit input from DBERC0 41. In this manner, only when the corresponding bit input from DBERC0 41 is asserted can the corresponding bit field (e.g. $BIT_8$, $BIT_9$, and $BIT_{15}$) be written to by the software debugger. That is, when the corresponding bit input from DBERC0 41 is not asserted, then the corresponding bit field cannot be written to. Note that $BIT_8$, $BIT_9$, and $BIT_{15}$ stored in storage circuits 236, 238, and 240, respectively, correspond to bit field locations 8, 9, and 15 of a debug control register (such as DBCR0-DBCR4) or of DBSR 49. That is, AND gates such as AND gates 230, 232, and 234 may be present in the write path to the registers, as needed, in debug registers 42. For example, storage circuit 236 may correspond to the register storage bit of IAC3 bit field 63 of DBCR0 50 (where IAC3 bit field 63 is stored in bit field location 8 of DBCR0 50). If storage circuit 236 corresponds to a register storage bit of DBSR 49, then storage circuit 236 may correspond to the register storage bit of DAC1 W bit field 92 (where DAC1 W bit field 92 is stored in bit field location 8 of DBSR 49). It will be appreciated that a write enable signal to a storage circuit, such as storage circuit 240, can be disabled by using a three input and gate in place of AND gate 234, where the third input receives a negated representation of the signal received at the input IN1. In this manner, the software debugger can be prevented from controlling, e.g., writing, to a particular storage circuit.

In one embodiment, each field in DBSR 49 may be referred to as a status flag, where those fields corresponding to a hardware debugger-owned debug events may be referred to as hardware debugger status flags and those fields corresponding to a the software debugger-owned debug event may be referred to as the software debugger status flags. Note that the setting and clearing of hardware debugger status flags arise from running the hardware debugger while the setting and clearing of the software debugger status flags, if any, arise from running the software debugger. Masking circuitry 31 therefore masks locations in DBSR 49 where the hardware debugger status flags are located from being read by the software debugger while allowing both the hardware debugger status flags and the software debugger status flags to be read by the hardware debugger. Note that the functionality of masking circuitry 31 can be implemented in a variety of different ways using a variety of different circuitry to mask locations in the debug status register.

FIG. 18 illustrates one embodiment of external debug command register 33 of FIG. 2. External debug command register 33 receives debug commands via the debug port from a hardware debugger, such as, for example, external debug circuitry 14. External debug command register 33 includes a read/write command field 250 and a register select field 254. In the illustrated embodiment, read/write command field 250 is a single bit field and register select field 254 includes 7 bits. External debug command register 33 may also include bits 252 reserved for future use. Although FIG. 18 illustrates a specific embodiment of the present invention which uses specific bit fields, alternate embodiments of the present invention may use different bit fields having different numbers of bits in each field. The specific bit fields depicted in FIG. 18 are shown only for illustrative purposes. Furthermore, as with any of the registers described herein, more or less registers may be used to store the data. By way of example, external debug command register 33 may include 10 bits.

FIG. 19 shows, in a tabular form, functionality of external debug command register 33 of FIG. 18, in accordance with one embodiment of the present invention.

Read/write command bit 250 specifies the direction of data transfer. If the read/write command bit is 0, then the data associated with the external debug command is written into the register specified by register select field 254. If the read/write command bit is 1, then the data contained in the register specified by register select field 254 is read. In one embodiment, the read/write command bit is ignored for read-only or write-only registers. Register select field 254 defines which register is the source register for a read operation or the destination register for a write operation. In one embodiment, attempted writes to read-only registers are ignored.

FIG. 20 illustrates, in tabular form, register addresses which may be used in register select field 254, in accordance with one embodiment of the present invention. Alternate embodiments may define the register addresses differently. For example, referring to FIG. 20, a value of 0100000 for register select field 254 indicates IAC1 register in debug registers 42, as illustrated in row 276. As illustrated in row 298, a value of 0110000 for register select field 254 indicates DBSR register 49. Therefore, each of rows 266, 276, 278, 280, 282, 284, 286, 288, 290, 294, 298, 300, 302, 304, 306, and 310 illustrate the different values for register select field 254 which indicate the JTAG ID register, IAC1 register, IAC2 register, IAC3 register, IAC4 register, DAC1 register, DAC2 register, DVC1 register, DVC2 register, DBCNT register, DBSR register, DBCR0-3 registers, and the DBERC0 register, respectively. Therefore, in external debug mode, external debug circuitry 14 can provide a command to external debug command register 33 via the debug port. For example, in external debug mode, if the hardware debugger wants to assign debug event resources to the software debugger, it can provide a command in which the read/write command field is set to 0 and register select field is set to 0111111 (as illustrated in row 310). The hardware debugger can then write the desired value to DBERC0 41 via the debug port.

Figure 21:
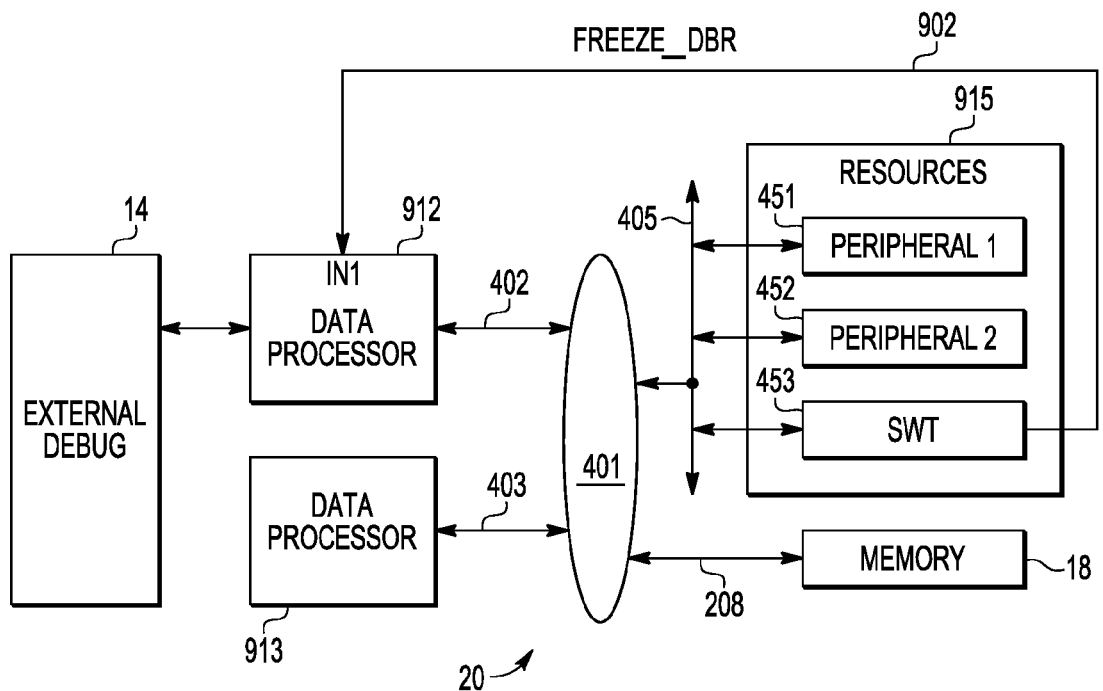
FIG. 21 illustrates, in block diagram form, a particular implementation of the system of FIG. 1 in accordance with the present disclosure.

FIG. 21 illustrates a specific embodiment of the data processing system 10 of FIG. 1, wherein the system resources 915 include a plurality of peripherals including peripheral_1 451, peripheral_2 453, and a watchdog timer 453. Each of the peripheral 915 are system resources in that they are not dedicated to a particular data processor. The interconnect 20 of FIG. 21 is implemented by busses 402 through 405 that are connected to a cross-point switch 401, or other control module that routes communication requests between a plurality of source and destination modules. A signal labeled FREEZE_DBR is communicated from the watchdog timer 453 to the input IN1 of the internal debug circuitry 40 via interconnect 912. External debug device 14 is connected to data processor 912.

During operation, the watchdog timer is initialized, and the debug circuitry of processor 912 is initialized to indicate a criteria for debug event IAC4 that results in a watchpoint being provided to the watchdog timer 453 each time the compare address of the compare address field IAC4 matches an address at the processor 912. When an IAC4 debug event occurs, the software debugger provides a watchpoint to the bus interface unit 34 of the processor 912, which further communicates with the interconnect 20 to provide the watchpoint to the watchdog timer 453.

Some time after initialization of the debug registers, the signal FREEZE_DBR is asserted to prevent modification of the criteria associated with IAC4 that determines when an IAC4 debug event occurs. The signal FREEZE_DBR can be asserted during initialization of the watchdog timer 915, e.g., by setting a register value at watchdog timer 453. Alternatively, the signal FREEZE_DBR can be asserted responsive to a register field being asserted the next time the watchdog timer receives a service request. Note that if the register field is not asserted that the signal FREEZE_DBR would not be set by a service request In one embodiment, the signal FREEZE_DBR can only be cleared by resetting, or re-initializing the watchdog timer 453.

Figure 22:
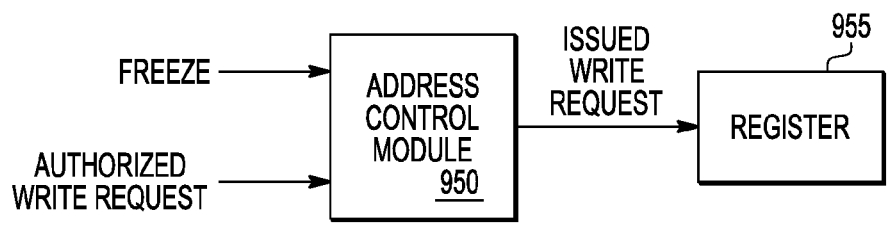
FIG. 22 illustrates, in block diagram form, a particular implementation of an access control module of the debugger in accordance with the present disclosure.

FIG. 22 illustrates an access control module 950 of the debug circuitry of the data processor 912 that includes a first input to receive a freeze signal and an authorized write request to write to a register 955 that is a portion of a debug event resource of a debug event. Based upon the state of the FREEZE signal, the request will be prevented from occurring, e.g., issued.

As described above, read accesses by the software debugger in external debug mode are masked such that bit fields which are not the software debugger-owned (but are hardware debugger-owned) return a zero. In this manner, consistency is maintained by the software operations. However, note that in one embodiment, when the hardware debugger reads a debug register, such as DBSR 49, its full values are provided. That is, even the values for those bit fields that are the software debugger-owned are provided to the hardware debugger.

Therefore, it can be appreciated how a hardware debugger and a software debugger can run contemporaneously, with debug event resources shared between the hardware debugger and the software debugger. In one embodiment, the ability to enable availability of a portion of the debug event resources for use by the software debugger while in external debug mode allows for the hardware debugger to be able to debug the software debugger. For example, in one embodiment in which interrupts are enabled, occurrences of a the software debugger-owned debug event may generate an interrupt which is then handled by the software debugger. This handler (i.e. software routine) can then suspend execution or halt the processor so as to provide control to the hardware debugger. In this manner, the hardware debugger can direct debug operations via external debug command register 33 and thus debug the debugger software itself. Note that in alternate embodiments, other types of storage circuitry or logic circuitry may be used to actually enable availability of debug event resources to the software debugger rather than via a control register such as debug event resource control register 41.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. As a further example, the indicator received at signal IN1 can be a signal that is received at the processor 912 concurrently with the data debug event resource determining its state, or the indicator received at signal IN1 can be latched at a register of the processor 912, such as by a write operation. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. Also for example, system 10 or portions thereof may be soft or code representations of physical circuitry or of logical representations convertible into physical circuitry. As such, system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software debugger described herein may be received elements of data processing system 10, for example, from computer readable media such as memory 18 or other media on other computer systems. Such computer readable media may be permanently, removably or remotely coupled to an information processing system such as data processing system 10. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

The term "coupled," as used herein, is not intended to be limited to a direct coupling or a mechanical coupling.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method comprising:
   preventing an authorized request from a software debugger to control a debug event resource, the debug event resource configured to be owned by the software debugger, wherein the software debugger and the debug event resource are both portions of a data processor unit, and the debug event is a debug event of the data processor unit.

2. The method of claim 1, wherein the preventing is responsive to an indicator received at a debug circuitry that includes the debug event resource.

3. The method of claim 2, wherein the indicator is provided by a peripheral to the data processor unit.

4. The method of claim 3, further comprising:
   providing a first debug event notification to the peripheral, the first debug event notification provided based upon a first occurrence of the debug event occurring, wherein the first occurrence occurs after the preventing; and
   servicing the first debug event notification at the peripheral.

5. The method of claim 4, wherein the indicator is provided by the peripheral responsive to the peripheral servicing a second debug event notification based upon an occurrence of the debug event that prior to the first debug event notification.

6. The method of claim 4, wherein providing the first debug event notification includes providing the first debug event notification to a bus interface unit of the data processor unit for transmission to the peripheral over a system bus interface.

7. The method of claim 3 further comprising:
   providing a first debug event notification based upon an occurrence of the debug event to a system bus interface for transmission to the peripheral; and
   providing the indicator from the peripheral to the system bus interface for transmission to the data processor unit.

8. The method of claim 7, wherein the indicator is included in a write request to write an address to an address compare field of a debug register of the debug circuitry, and the occurrence of the debug event occurs based upon a match between the address stored at the address compare field and an address being processed by the data processor unit.

9. The method of claim 1, wherein the request is a write request to a field of a debug register of the debug circuitry.

10. The method of claim 1, wherein the preventing is responsive to an indicator received at an external pin of the data processor unit, the external pin not associated with a debug interface that provides debug control information between the data processor unit and a hardware debugger.

11. The method of claim 1 further comprising:
    storing a first indicator at debug circuitry to indicate the debug event resource is configured to be owned by a hardware debugger that is external the data processor unit, the first indicator provides the hardware debugger responsibility for servicing the debug event or for assigning shared responsibility of servicing the debug event, authorization to write register fields of the debug circuitry associated with detection of the debug event, and wherein after storing the first indicator the software debugger does not have authorization to write to the register fields; and
    storing, prior to the preventing, a second indicator from the hardware debugger to the debug circuitry to configure the debug event resource to be owned by the software debugger.

12. The method of claim 1, wherein the occurrence of the debug event occurs based upon a match between information stored at a field of the debug register and a current value being processed by the data processor unit.

13. An integrated circuit comprising a data processor unit, the data processor unit comprising:
    a debug event resource controlled by a plurality of debug fields, including a first portion of the plurality of debug fields that are to store information that indicates a software debugger is to service a debug event of the debug event resource, and a second portion of the plurality of debug fields to determine the occurrence of a debug event of the debug event; and
    an access control module comprising a first input to receive a freeze signal, and, when the information indicates that a software debugger is to service the debug event, the access control module to determine an authorized access request to the second portion of the plurality of debug fields by the software debugger is to be ignored responsive to the freeze signal having a first state.

14. The integrated circuit of claim 13 further comprising:
    a debug interface unit to communicate the occurrence of debug events to be serviced by a hardware debugger external the data processor unit.

15. The integrated circuit of claim 13 further comprising:
    a peripheral;
    a system interconnect coupled to the data processor unit and to the peripheral; and
    a system interface unit to receive notification of the occurrence of the debug event, and to communicate the notification to the peripheral via the system interconnect.

16. A method comprising:
    storing at a data processor unit a first indicator that assigns servicing of a debug event to a software debugger of the data processor unit, and that authorizes a debug event resource of the debug event to be controlled by software routines initiated by the software debugger;
    receiving, from an authorized request responsive to a software routine initiated by the software debugger, a request to control the debug event resource; and
    determining whether to prevent the authorized request from controlling the debug event resource based upon a second indicator.

17. The method of claim 16, wherein the second indicator is based upon an input signal provided to an input of the data processor unit concurrently with determining whether to prevent the authorized access.

18. The method of claim 16, wherein the second indicator is provided to the data processor unit via an interconnect from a peripheral, wherein the interconnect communicates information between the data processor unit and a plurality of peripherals including the peripheral.

19. The method of claim 16, wherein the debug event is based upon an address stored at the debug event resource matching an address being processed by the data processor unit.

20. The method of claim 16, wherein the request to control the debug event resource is a write request.

* * * * *